(12) United States Patent
Carter et al.

(10) Patent No.: US 7,197,451 B1
(45) Date of Patent: Mar. 27, 2007

(54) METHOD AND MECHANISM FOR THE CREATION, MAINTENANCE, AND COMPARISON OF SEMANTIC ABSTRACTS

(75) Inventors: Stephen R. Carter, Provo, UT (US); Delos C. Jensen, Orem, UT (US); Ronald P. Millett, Orem, UT (US)

(73) Assignee: Novell, Inc., Provo, UT (US)

( * ) Notice: Subject to any disclaimer, the term of this patent is extended or adjusted under 35 U.S.C. 154(b) by 886 days.

(21) Appl. No.: 09/615,726

(22) Filed: Jul. 13, 2000

Related U.S. Application Data

(63) Continuation-in-part of application No. 09/512,963, filed on Feb. 25, 2000, and a continuation-in-part of application No. 09/109,804, filed on Jul. 2, 1998, now Pat. No. 6,108,619.

(51) Int. Cl.
*G06F 17/21* (2006.01)
(52) U.S. Cl. ............................................. 704/10; 704/9
(58) Field of Classification Search ................. 704/257, 704/2–10
See application file for complete search history.

(56) References Cited

U.S. PATENT DOCUMENTS

| | | | | |
|---|---|---|---|---|
| 5,276,677 A | | 1/1994 | Ramamurthy et al. ......... 370/60 |
| 5,278,980 A | | 1/1994 | Pedersen et al. | |
| 5,317,507 A | * | 5/1994 | Gallant ........................ 707/532 |
| 5,325,298 A | * | 6/1994 | Gallant ............................ 704/9 |
| 5,390,281 A | | 2/1995 | Luciw et al. | |
| 5,539,841 A | * | 7/1996 | Huttenlocher et al. ...... 382/218 |
| 5,551,049 A | | 8/1996 | Kaplan et al. .............. 707/532 |
| 5,619,709 A | * | 4/1997 | Caid et al. .................... 715/532 |
| 5,675,819 A | | 10/1997 | Schuetze ...................... 704/10 |
| 5,694,523 A | * | 12/1997 | Wical ........................... 706/45 |
| 5,696,962 A | | 12/1997 | Kupiec ....................... 395/604 |
| 5,708,825 A | * | 1/1998 | Sotomayor ............... 715/501.1 |
| 5,721,897 A | | 2/1998 | Rubinstein ..................... 707/2 |
| 5,778,362 A | | 7/1998 | Deerwester ................... 707/5 |
| 5,778,378 A | | 7/1998 | Rubin ........................ 707/103 |

(Continued)

OTHER PUBLICATIONS

Bartell et al., Latent Semantic Indexing is an Optimal Special Case of Multidimensional Scaling, Citeseer, p. 1-7.*

(Continued)

*Primary Examiner*—Richemond Dorvil
*Assistant Examiner*—Lamont Spooner
(74) *Attorney, Agent, or Firm*—Marger Johnson & McCollom, P.C.

(57) ABSTRACT

Codifying the "most prominent measurement points" of a document can be used to measure semantic distances given an area of study (e.g., white papers on some subject area). A semantic abstract is created for each document. The semantic abstract is a semantic measure of the subject or theme of the document providing a new and unique mechanism for characterizing content. The semantic abstract includes state vectors in the topological vector space, each state vector representing one lexeme or lexeme phrase about the document. The state vectors can be dominant phrase vectors in the topological vector space mapped from dominant phrases extracted from the document. The state vectors can also correspond to words in the document that are most significant to the document's meaning (the state vectors are called dominant vectors in this case). One semantic abstract can be directly compared with another semantic abstract, resulting in a numeric semantic distance between the semantic abstracts being compared.

40 Claims, 22 Drawing Sheets

U.S. PATENT DOCUMENTS

| | | | |
|---|---|---|---|
| 5,778,397 A * | 7/1998 | Kupiec et al. | 715/500 |
| 5,794,178 A | 8/1998 | Caid et al. | 704/9 |
| 5,799,276 A | 8/1998 | Komissarchik et al. | 704/251 |
| 5,822,731 A | 10/1998 | Schultz | 704/256 |
| 5,832,470 A | 11/1998 | Morita et al. | |
| 5,867,799 A | 2/1999 | Lang et al. | 707/1 |
| 5,873,056 A * | 2/1999 | Liddy et al. | 704/9 |
| 5,934,910 A | 8/1999 | Ho et al. | 434/362 |
| 5,937,400 A * | 8/1999 | Au | 706/55 |
| 5,940,821 A * | 8/1999 | Wical | 707/3 |
| 5,963,965 A * | 10/1999 | Vogel | 715/501.1 |
| 5,966,686 A | 10/1999 | Heidorn et al. | 704/9 |
| 5,970,490 A * | 10/1999 | Morgenstern | 707/10 |
| 5,974,412 A | 10/1999 | Hazlehurst et al. | 707/3 |
| 5,991,713 A | 11/1999 | Unger et al. | 704/9 |
| 6,006,221 A * | 12/1999 | Liddy et al. | 707/5 |
| 6,009,418 A * | 12/1999 | Cooper | 706/15 |
| 6,078,953 A | 6/2000 | Vaid et al. | 709/223 |
| 6,085,201 A | 7/2000 | Tso | |
| 6,097,697 A | 8/2000 | Yao et al. | |
| 6,105,044 A | 8/2000 | DeRose et al. | |
| 6,108,619 A * | 8/2000 | Carter et al. | 704/9 |
| 6,122,628 A | 9/2000 | Castelli | |
| 6,173,261 B1 * | 1/2001 | Arai et al. | 704/257 |
| 6,205,456 B1 * | 3/2001 | Nakao | 715/531 |
| 6,289,353 B1 * | 9/2001 | Hazlehurst et al. | 707/102 |
| 6,295,533 B2 | 9/2001 | Cohen | |
| 6,297,824 B1 | 10/2001 | Hearst et al. | |
| 6,311,194 B1 | 10/2001 | Sheth et al. | 707/505 |
| 6,317,708 B1 * | 11/2001 | Witbrock et al. | 704/9 |
| 6,317,709 B1 | 11/2001 | Zack | 704/225 |
| 6,356,864 B1 * | 3/2002 | Foltz et al. | 704/1 |
| 6,363,378 B1 | 3/2002 | Conklin et al. | |
| 6,459,809 B1 * | 10/2002 | Jensen et al. | 382/203 |
| 6,470,307 B1 * | 10/2002 | Turney | 704/9 |
| 6,493,663 B1 | 12/2002 | Ueda | |
| 6,513,031 B1 | 1/2003 | Fries et al. | 707/3 |
| 6,523,026 B1 | 2/2003 | Gillis | 707/3 |
| 6,615,208 B1 | 9/2003 | Behrens et al. | 707/5 |
| 6,675,159 B1 | 1/2004 | Lin et al. | 707/3 |

OTHER PUBLICATIONS

Hocking, "Topology,", 1961, pp. 6-7, 56-59, 68-71.*
George W. Smith, "Computers and Human Language," 1991, pp. 204-257.
Vivian Cook and Mark Newson, "Chomsky's Universal Grammar— An Introduction," 1988, pp. 40-74, 131-272.
Noam Chomsky, "The Minimalist Program," 1995, pp. 13-127.
David Pesetsky, "Zero Syntax Experiencers and Cascades," 1995, pp. 1-122.
*Applications of Functional Analysis and Operator Theory*, V. Hutson, J.S. Pym, 1980, table of contents, preface and index.
Latent Semantic Indexing is an Optimal Special Case of Multidimensional Scaling, Brian T. Bartell, Garrison W. Cottrell, Richard K. Belew, pp. 161-167, 1992; ACM 0-89791-524-0.
Improving Relevance Feedback in the Vector Space Model, Carol Lundquist, David A. Grossman, Ophir Frieder, 1997, pp. 16-23; ACM 0-89791-970-X.
A Multilevel Approach to Intelligent Information Filtering: Model, System, and Evaluation, J. Mostafa, S. Mukhopadhyay, W. Lam, M. Palakal, ACM Transactions On Information Systems, vol. 15, No. 4, Oct. 1997, pp. 368-399.
Capturing the State of Distributed Systems with XML, Rohit Khare and Adam Rifkin, Oct. 26, 1997, pp. 1-12.
Semantic Information Retrieval, Annelise Mark Pejtersen, pp. 90-92, Communications of the ACM, Apr. 1998/vol. 41, No. 5.
Unifying Heterogeneous Information Models, Narinder Singh, pp. 37-44, Communications of the ACM, May 1998/vol. 41, No. 5.
Platform for Internet Content Selection (PICS), Jan. 3, 1998, http://www.w3.org/pics/.
Intelligent Collaboration & Visualization, pp. 1-16.
Noam Chomsky, "Language and Thought," 1993, pp. 18-19, 22-27, 44-45, 60-61.
Jonathan Culler, "Ferdinand de Saussure—Revised Edition," 1986, pp. 38-57.
Umberto Eco, Marco Santambrogio and Patrizia Violi (Editors), "Meaning and Mental Representations," 1988, p. 221.
Donald W. Kahn, "Topology—An Introduction to the Point-Set and Algebraic Areas," 1975, pp. 10-15.
Paul R. Halmos, "Naïve Set Theory," 1960, pp. 56-57, 66-69.
Umberto Eco, "Semiotics and the Philosophy of Language," 1984, pp. 46-87.
Noam Chomsky, "The Minimalist Program," 1995, pp. 13-65.
R. E. Edwards, "Functional Analysis—Theory and Applications," 1965, pp. 10-13, 32-33, 50-53, 62-65, 88-103, 174-203, 224-233.
Cognitive Science Laboratory at Princeton University, "WordNet—A Lexical Database for English," printed Feb. 10, 2000, selected pages from website.
George W. Smith, "Computers and Human Language," 1991, pp. 204-257.
Vivian Cook and Mark Newson, "Chomsky's Universal Grammer— An Introduction," 1988, pp. 40-74, 131-272.
Noam Chomsky, "The Minimalist Program," 1995, pp. 13-127.
David Pesetsky, "Zero Syntax Experiencers and Cascades," 1995, pp. 1-122.
Onyshkevych and Nirenburg; "A Lexicon for Knowledge-Based MT"; Undated (pp. 1-49).
Mahesh; "Ontology Development for Machine Translation: Ideology and Method"; Computing Research Laboratory, New Mexico State University; Undated (87 pages).

* cited by examiner

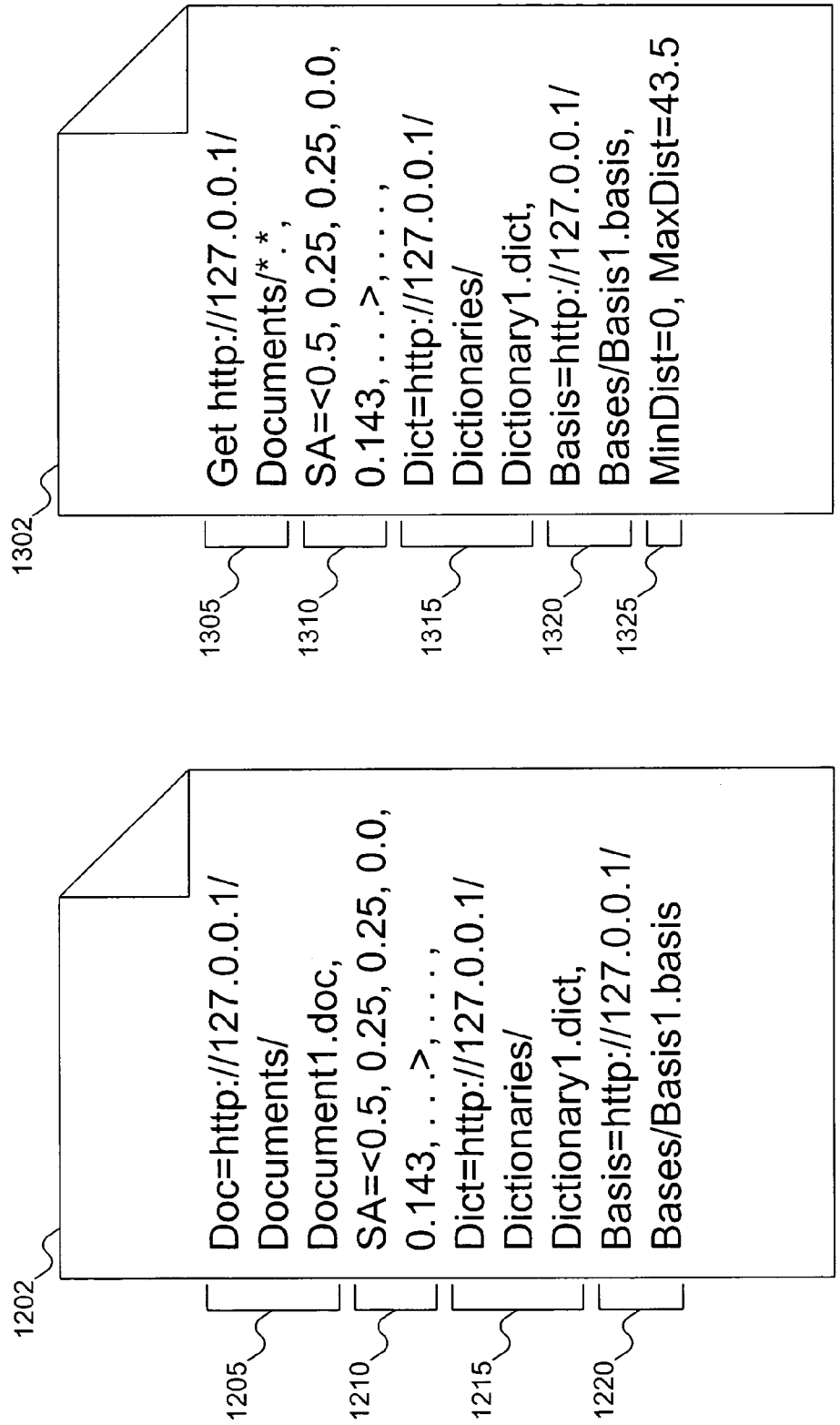

| 1705 | Concepts |
|---|---|
| 1 | man |
| 2 | dust |
| 3 | iguana |
| 4 | category |
| 5 | energy |
| 6 | thing |
| 7 | matter |
| 8 | cat |
| 9 | potential energy |
| ... | ... |

ME: 6 (1710)

Chains (1715):
| 1 | 6 | 5 | 9 | 7 | 2 | 0 |
| 2 | 6 | 4 | ... | | | |
| ... | | | | | | |

Basis Chains (1720): | 1 | 4 | 8 | 5 | ... |

Euclidean Distance (1725A):

| | 1 | 2 | 3 | ... |
|---|---|---|---|---|
| 1 | 0 | ~1.96 | ~1.67 | |
| 2 | ~1.96 | 0 | ~0.80 | |
| 3 | ~1.67 | ~0.80 | 0 | |
| ... | | | | ⋱ |

Angle Subtended (1725B):

| | 1 | 2 | 3 | ... |
|---|---|---|---|---|
| 1 | 0 | ~51° | ~42° | |
| 2 | ~51° | 0 | ~31° | |
| 3 | ~42° | ~31° | 0 | |
| ... | | | | ⋰ |

FIG. 17

METHOD AND MECHANISM FOR THE CREATION, MAINTENANCE, AND COMPARISON OF SEMANTIC ABSTRACTS

RELATED APPLICATION DATA

This application is a continuation-in-part of U.S. patent application Ser. No. 09/109,804, titled "METHOD AND APPARATUS FOR SEMANTIC CHARACTERIZATION," filed Jul. 2, 1998, now U.S. Pat. No. 6,108,619 issued Aug. 22, 2000, and of co-pending U.S. patent application Ser. No. 09/512,963, titled "CONSTRUCTION, MANIPULATION, AND COMPARISON OF A MULTI-DIMENSIONAL SEMANTIC SPACE," filed Feb. 25, 2000, currently pending.

FIELD OF THE INVENTION

This invention pertains to determining the semantic content of documents, and more particularly to summarizing and comparing the semantic content of documents to determine similarity.

BACKGROUND OF THE INVENTION

U.S. patent application Ser. No. 09/512,963, titled "CONSTRUCTION, MANIPULATION, AND COMPARISON OF A MULTI-DIMENSIONAL SEMANTIC SPACE," filed Feb. 25, 2000, describes a method and apparatus for mapping terms in a document into a topological vector space. Determining what documents are about requires interpreting terms in the document through their context. For example, whether a document that includes the word "hero" refers to sandwiches or to a person of exceptional courage or strength is determined by context. Although taking a term in the abstract will generally not give the reader much information about the content of a document, taking several important terms will usually be helpful in determining content.

The content of documents is commonly characterized by an abstract that provides a high-level description of the contents of the document and provides the reader with some expectation of what may be found within the contents of the document. (In fact, a single document can be summarized by multiple different abstracts, depending on the context in which the document is read.) Patents are a good example of this commonly used mechanism. Each patent is accompanied by an abstract that provides the reader with a description of what is contained within the patent document. However, each abstract must be read and compared by a cognitive process (usually a person) to determine if various abstracts might be describing content that is semantically close to the research intended by the one searching the abstracts.

Accordingly, a need remains for a way to associate semantic meaning to documents using dictionaries and bases, and for a way to search for documents with content similar to a given document, both generally without requiring user involvement.

SUMMARY OF THE INVENTION

To determine a semantic abstract for a document, the document is parsed into phrases. The phrases can be drawn from the entire document, or from only a portion of the document (e.g., an abstract). State vectors in a topological vector space are constructed for each phrase in the document. The state vectors are collected to form the semantic abstract. The state vectors can also be filtered to reduce the number of vectors comprising the semantic abstract. Once the semantic abstract for the document is determined, the semantic abstract can be compared with a semantic abstract for a second document to determine how similar their contents are. The semantic abstract can also be compared with other semantic abstracts in the topological vector space to locate semantic abstracts associated with other documents with similar contents.

The foregoing and other features, objects, and advantages of the invention will become more readily apparent from the following detailed description, which proceeds with reference to the accompanying drawings.

BRIEF DESCRIPTION OF THE DRAWINGS

FIG. 12 shows a saved semantic abstract for a document according to the preferred embodiment.

FIG. 13 shows a document search request according to the preferred embodiment.

FIG. 17 shows data structures for storing a directed set, chains, and basis chains, such as the directed set of FIG. 14, the chains of FIG. 15, and the basis chains ofFIGS 16A–16G.

DETAILED DESCRIPTION OF THE PREFERRED EMBODIMENT

Determining Semantic Abstracts

Figure 14:
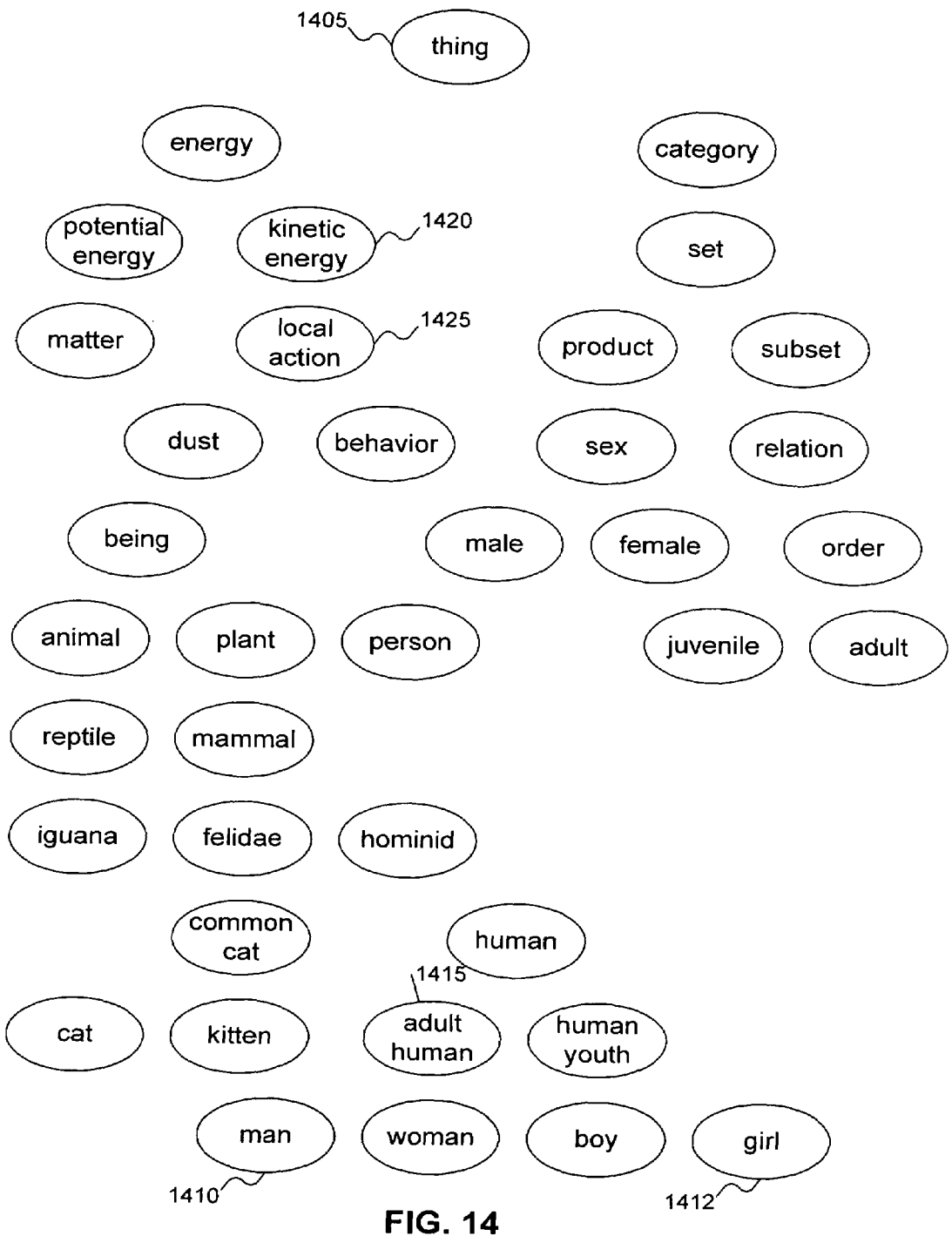
FIG. 14 shows an example of set of concepts that can form a directed set.
Figure 15:
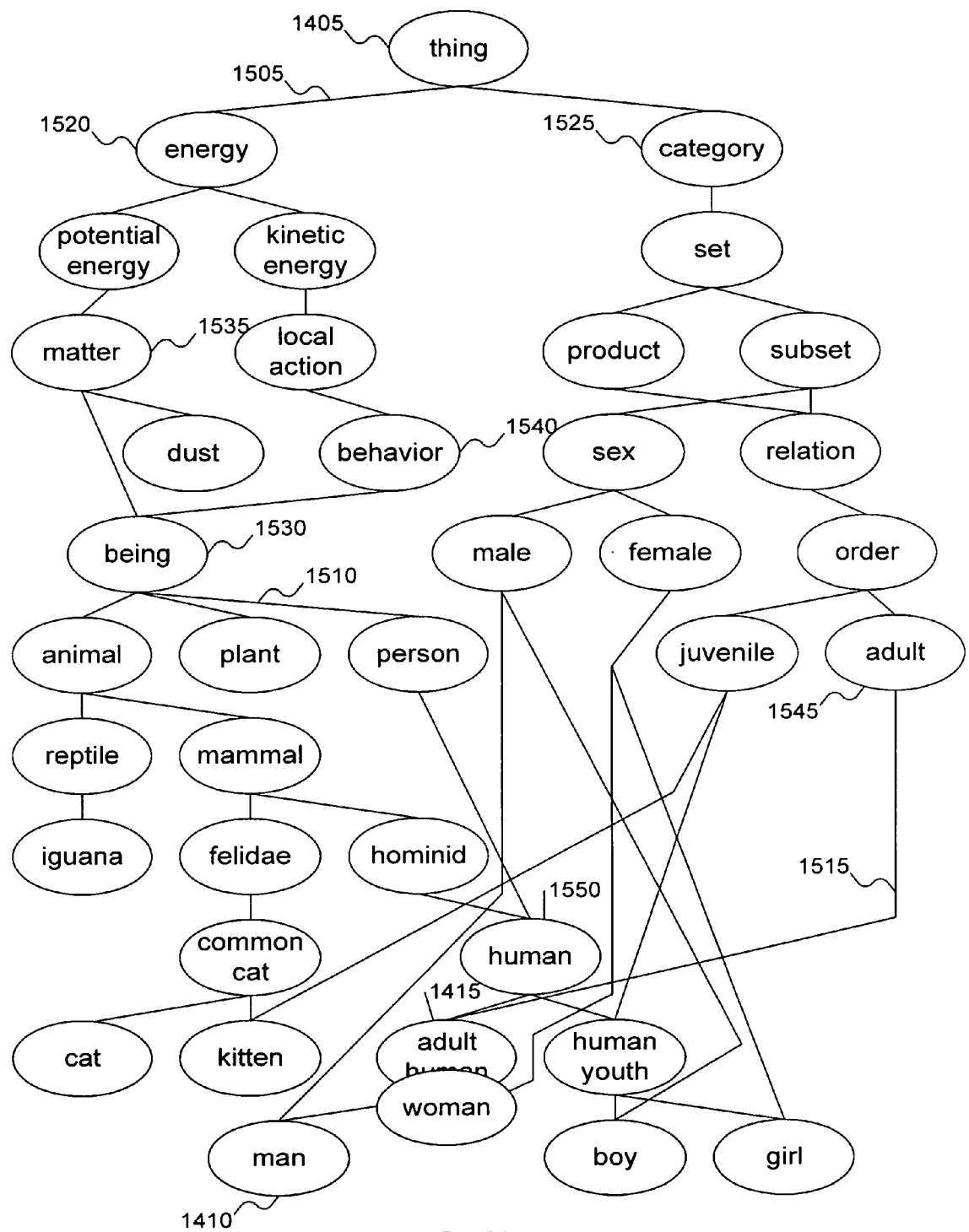
FIG. 15 shows a directed set constructed from the set of concepts of FIG. 14 in a preferred embodiment of the invention.

A semantic abstract representing the content of the document can be constructed as a set of vectors within the topological vector space. The construction of state vectors in a topological vector space is described in U.S. patent application Ser. No. 09/512,963, titled "CONSTRUCTION, MANIPULATION, AND COMPARISON OF A MULTI-DIMENSIONAL SEMANTIC SPACE," filed Feb. 25, 2000, incorporated by reference herein and referred to as "the Construction application." The following text is copied from that application:

> At this point, a concrete example of a (very restricted) lexicon is in order. FIG. 14 shows a set of concepts, including "thing" 1405, "man" 1410, "girl" 1412, "adult human" 1415, "kinetic energy" 1420, and "local action" 1425. "Thing" 1405 is the maximal element of the set, as every other concept is a type of "thing." Some concepts, such as "man" 1410 and "girl" 1412 are "leaf concepts," in the sense that no other concept in the set is a type of "man" or "girl." Other concepts, such as "adult human" 1415, "kinetic energy" 1420, and "local action" 1425 are "internal concepts," in the sense that they are types of other concepts (e.g., "local action" 1425 is a type of "kinetic energy" 1420) but there are other concepts that are types of these concepts (e.g., "man" 1410 is a type of "adult human" 1415).
>
> FIG. 15 shows a directed set constructed from the concepts of FIG. 14. For each concept in the directed set, there is at least one chain extending from maximal element "thing" 1405 to the concept. These chains are composed of directed links, such as links 1505, 1510, and 1515, between pairs of concepts. In the directed set of FIG. 15, every chain from maximal element "thing" must pass through either "energy" 1520 or "category" 1525. Further, there can be more than one chain extending from maximal element "thing" 1405 to any concept. For example, there are four chains extending from "thing" 1405 to "adult human" 1415: two go along link 1510 extending out of "being" 1535, and two go along link 1515 extending out of "adult" 1545.
>
> Some observations about the nature of FIG. 15:
>
> First, the model is a topolozical space.
>
> Second, note that the model is not a tree. In fact, it is an example of a directed set. For example, concepts "being" 1530 and "adult human" 1415 are types of multiple concepts higher in the hierarchy. "Being" 1530 is a type of "matter" 1535 and a type of "behavior" 1540; "adult human" 1415 is a type of "adult" 1545 and a type of "human" 1550.
>
> Third, observe that the relationships expressed by the links are indeed relations of hyponymy.
>
> Fourth, note particularly –but without any loss of generality –that "man" 1410 maps to both "energy" 1520 and "category" 1525 (via composite mappings) which in turn both map to "thing" 1405: i.e., the (composite) relations are multiple valued and induce a partial ordering. These multiple mappings are natural to the meaning of things and critical to semantic characterization.
>
> Finally, note that "thing" 1405 is maximal: indeed, "thing" 1405 is the greatest element of any quantization of the lexical semantic field (subject to the premises of the model).

Metrizing S

Figure 16A:
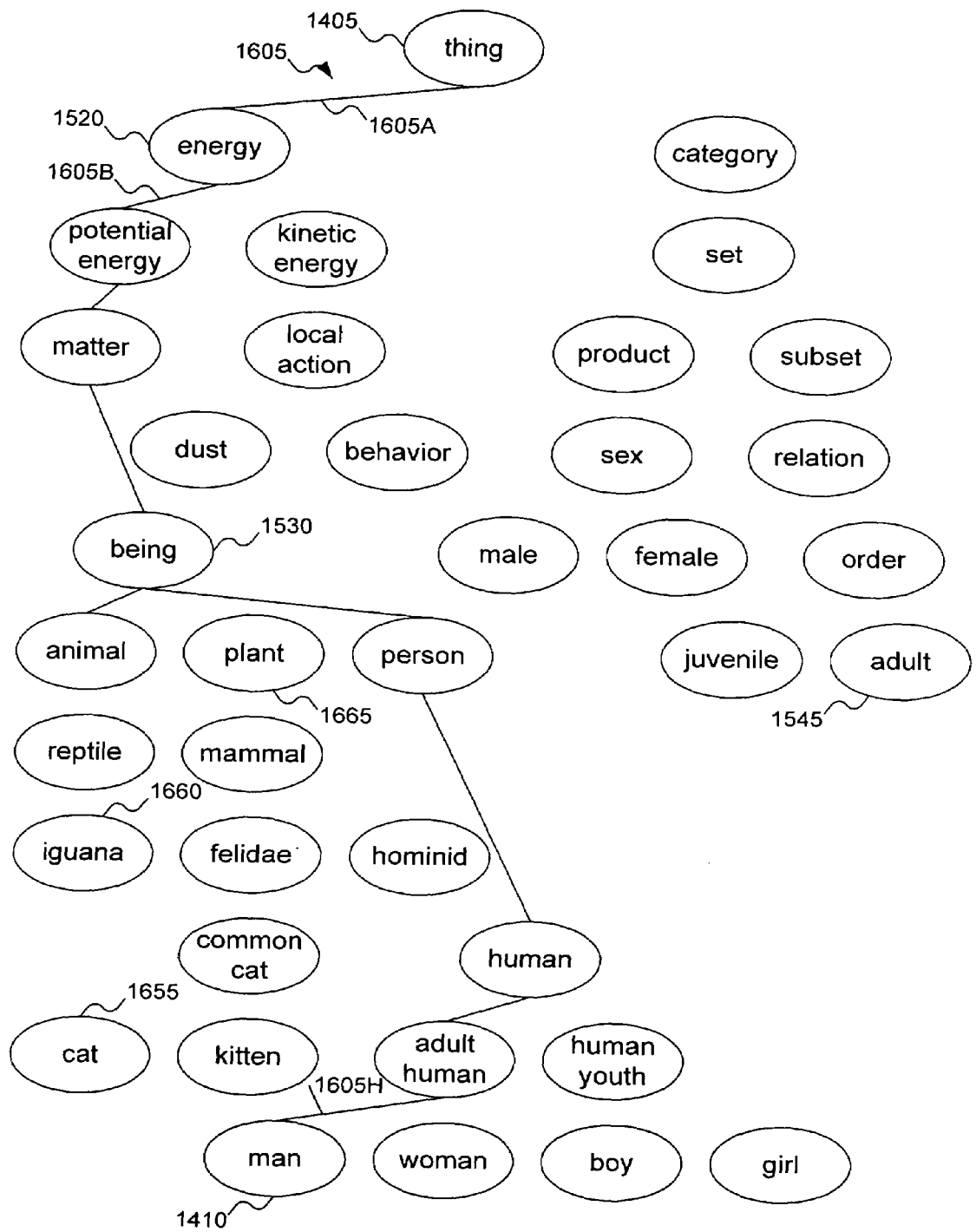
FIGS. 16A–16G show eight different chains in the directed set of FIG. 15 that form a basis for the directed set.
Figure 16B:
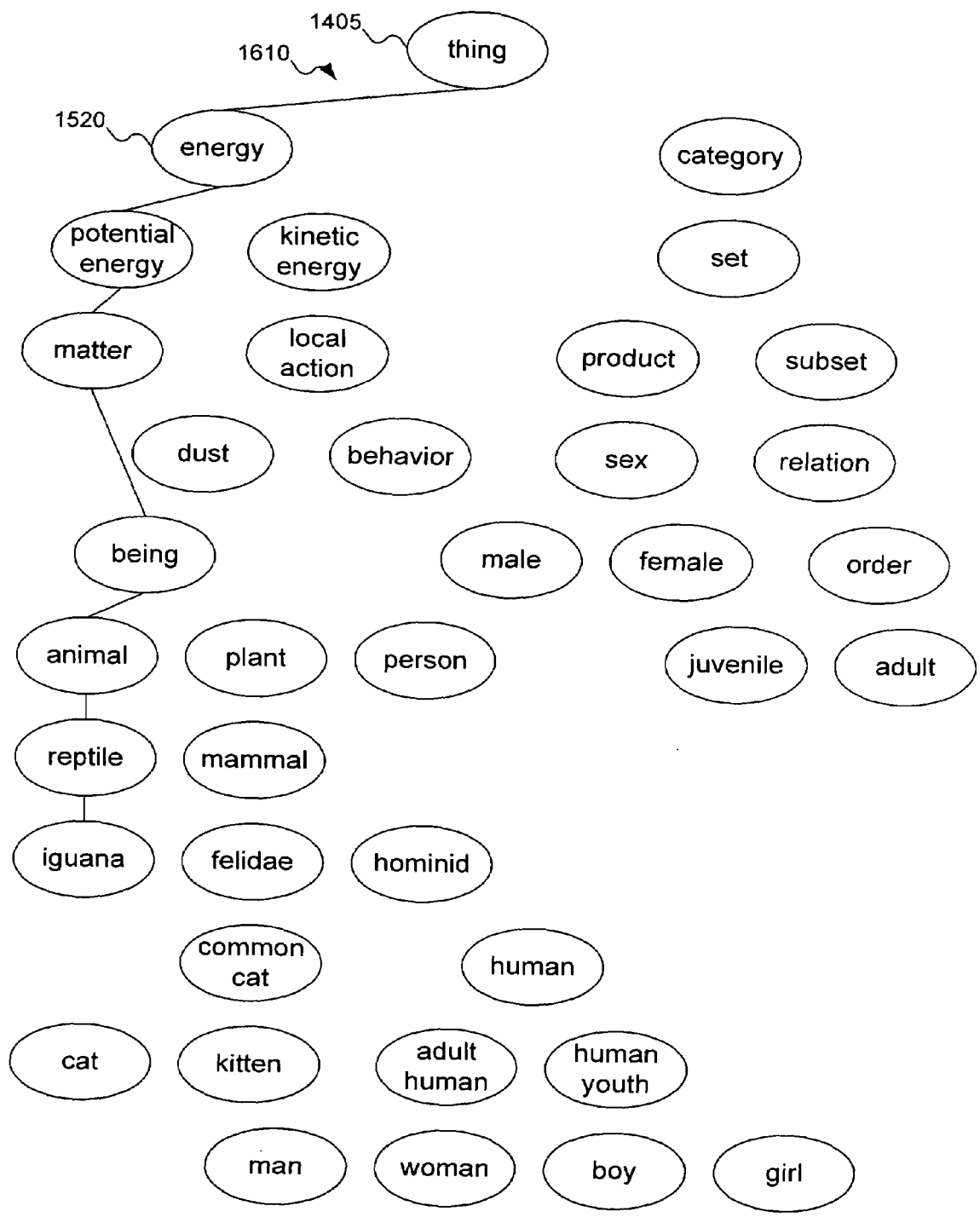
Figure 16C:
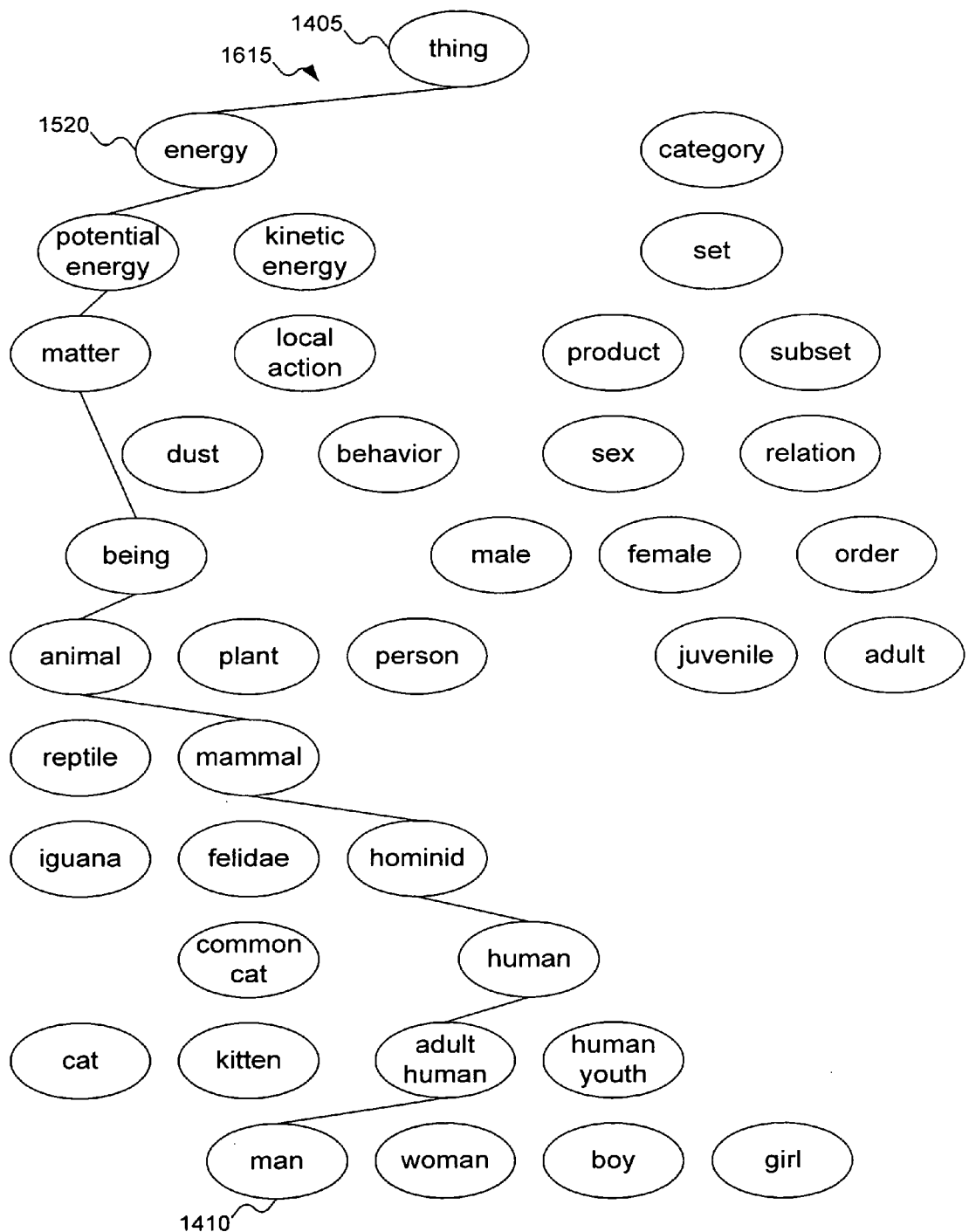
Figure 16D:
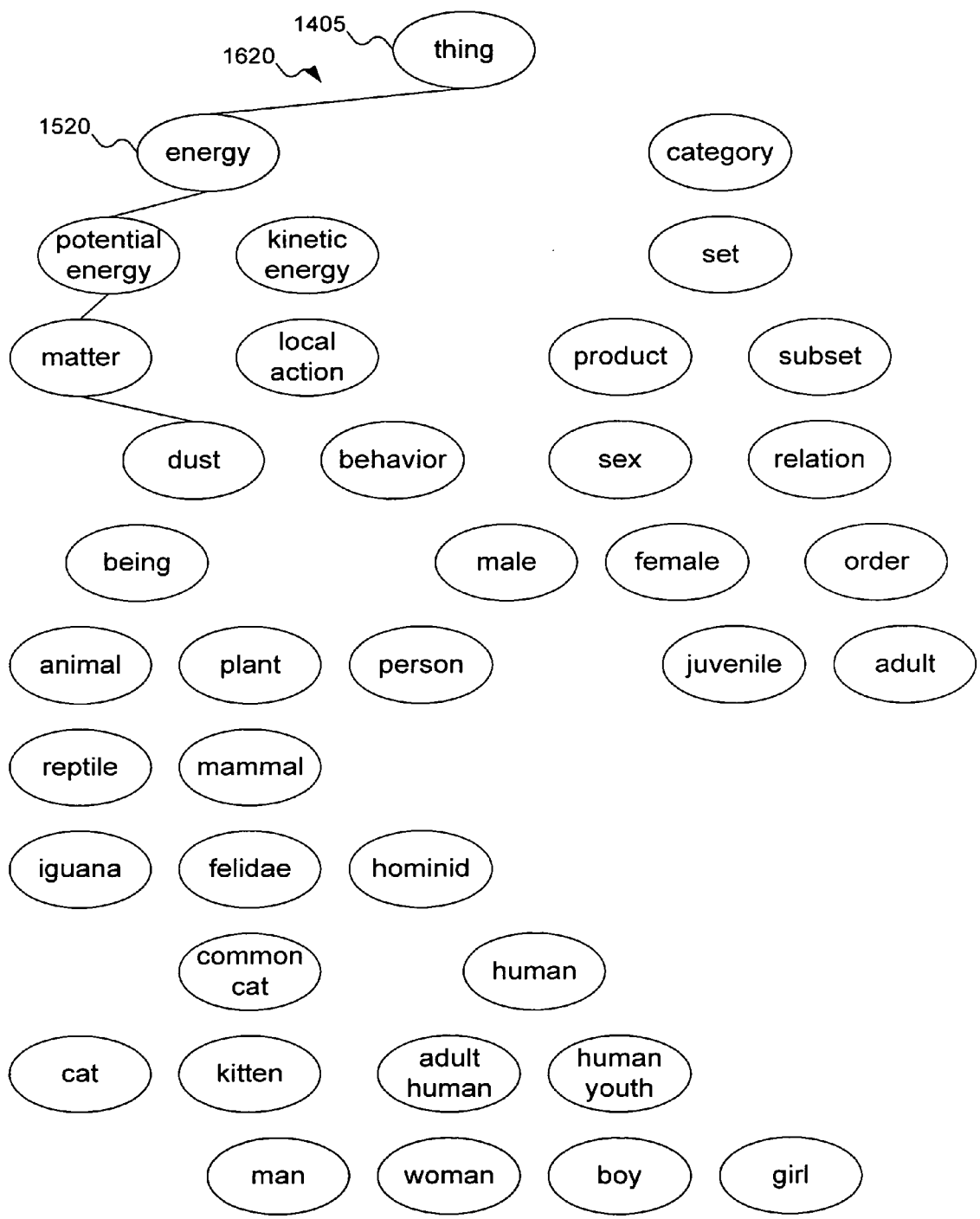
Figure 16E:
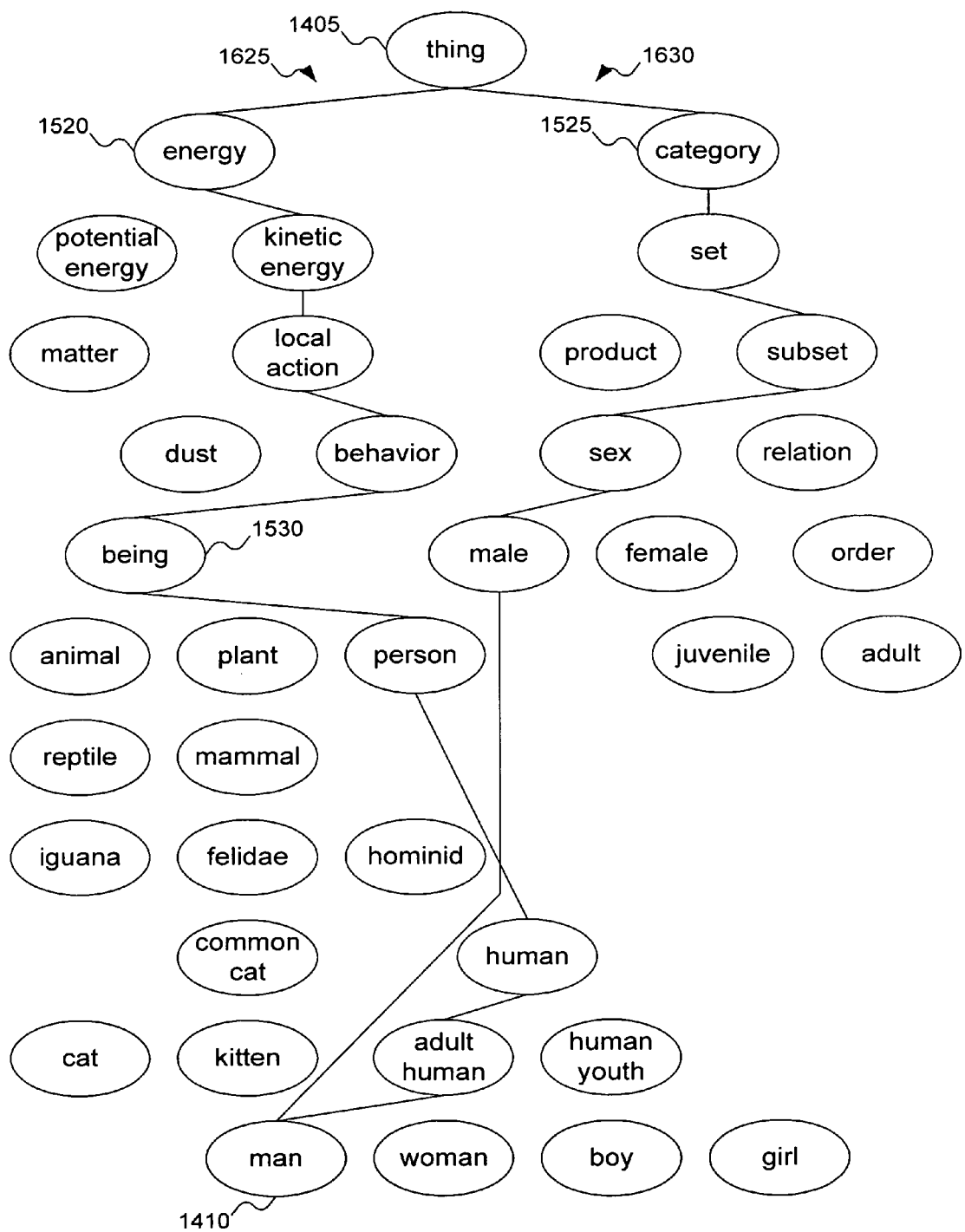
Figure 16F:
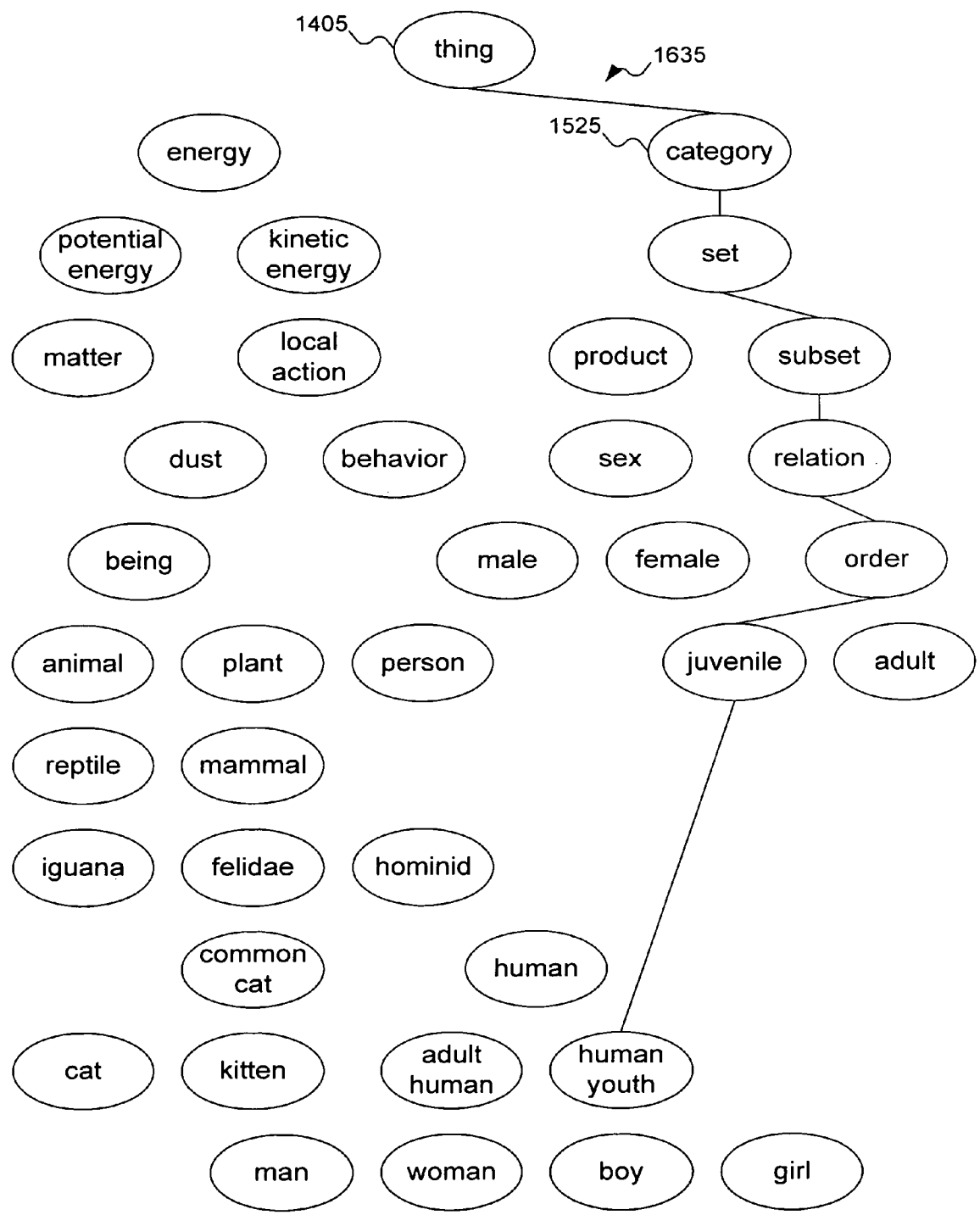
Figure 16G:
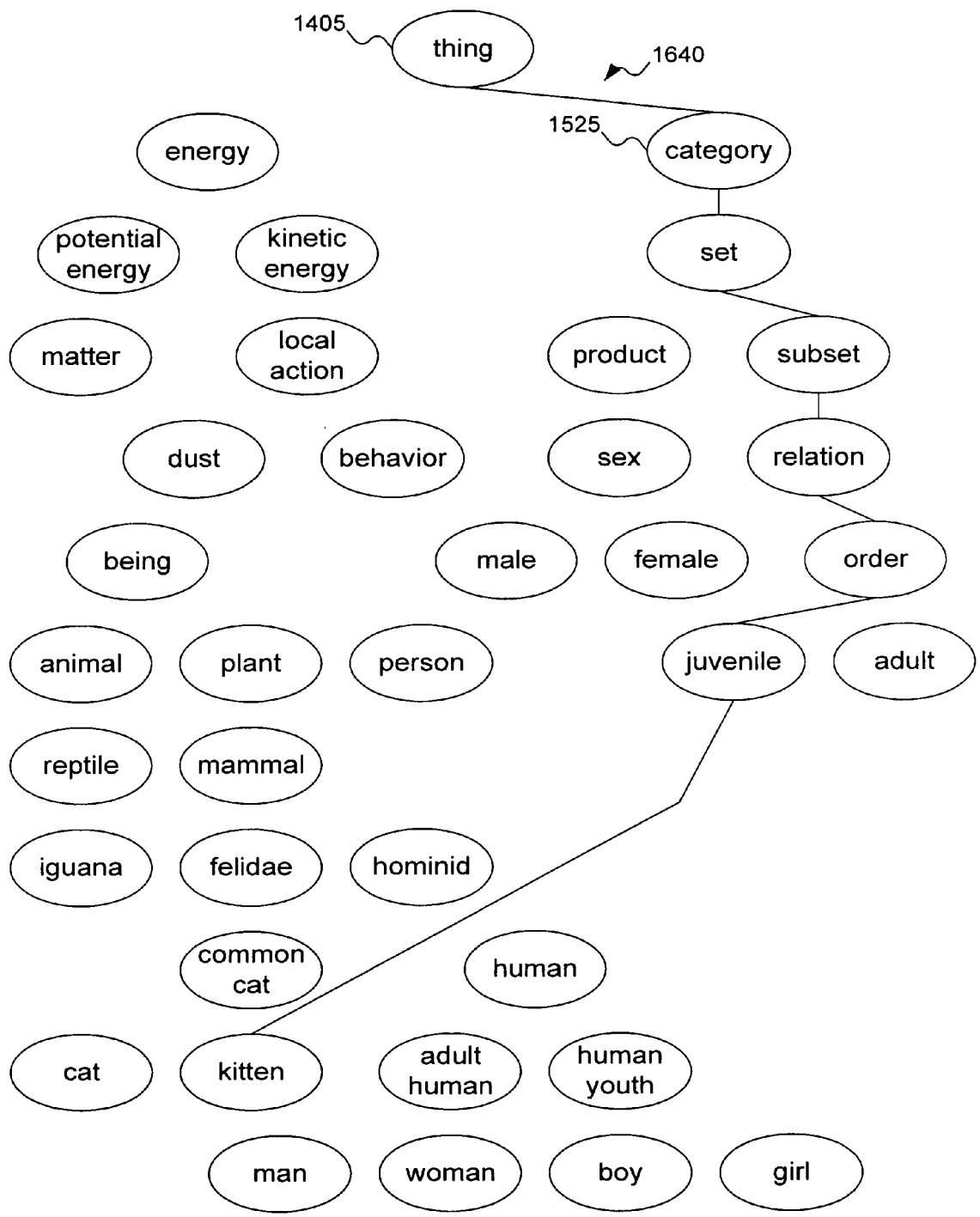

FIGS. 16A–16G show eight different chains in the directed set that form a basis for the directed set. FIG. 16A shows chain 1605, which extends to concept "man" 1410 through concept "energy" 1520. FIG. 16B shows chain 1610 extending to concept "iguana." FIG. 16C shows another chain 1615 extending to concept "man" 1410 via a different path. FIGs. 16D–16G show other chains.

FIG. 17 shows a data structure for storing the directed set of FIG. 14, the chains of FIG. 15, and the basis chains of FIGs. 16A–16G. In FIG. 17, concepts array 1705 is used to store the concepts in the directed set. Concepts array 1705 stores pairs of elements. One element identifies concepts by name; the other element stores numerical identifiers 1706. For example, concept name 1707 stores the concept "dust," which is paired with numerical identifier "2" 1708. Concepts array 1705 shows 9 pairs of elements, but there is no theoretical limit to the number of concepts in concepts array 1705. In concepts array 1705, there should be no duplicated numerical identifiers 1706. In FIG. 17, concepts array 1705 is shown sorted by numerical identifier 1706, although this is not required. When concepts array 1705 is sorted by numerical identifier 1706, numerical identifier 1706 can be called the *index* of the concept name.

Maximal element (ME) 1710 stores the index to the maximal element in the directed set. In FIG. 17, the concept index to maximal element 1710 is "6," which corresponds to concept "thing," the maximal element of the directed set of FIG. 15.

Chains array 1715 is used to store the chains of the directed set. Chains array 1715 stores pairs of elements. One element identifies the concepts in a chain by index; the other element stores a numerical identifier. For example, chain 1717 stores a chain of concept indices "6", "5", "9", "7", and "2," and is indexed by chain index "1" (1718). (Concept index 0, which does not occur in concepts array 1705, can be used in chains array 1715 to indicate the end of the chain. Additionally, although chain 1717 includes five concepts, the number of concepts in each chain can vary.) Using the indices of concepts array 1705, this chain corresponds to concepts "thing," "energy," "potential energy," "matter," and "dust." Chains array 1715 shows one complete chain and part of a second chain, but there is no theoretical limit to the number of chains stored in chain array 1715. Observe that, because maximal element 1710 stores the concept index "6," every chain in chains array 1715 should begin with concept index "6." Ordering the concepts within a chain is ultimately helpful in measuring distances between the concepts. However concept order is not reciuired. Further, there is no required order to the chains as they are stored in chains array 1715.

Basis chains array 1720 is used to store the chains of chains array 1715 that form a basis of the directed set. Basis chains array 1720 stores chain indices into chains array 1715. Basis chains array 1720 shows four chains in the basis (chains 1, 4, 8, and 5), but there is no theoretical limit to the number of chains in the basis for the directed set.

Euclidean distance matrix 1725A stores the distances between pairs of concepts in the directed set of FIG. 15. (How distance is measured between pairs of concepts in the directed set is discussed below. But in short, the concepts in the directed set are mapped to state vectors in multi-dimensional space, where a state vector is a directed line segment starting at the origin of the multi-dimensional space and extending to a point in the multi-dimensional space.) The distance between the end points of pairs of state vectors representing concepts is measured. The smaller the distance is between the state vectors representing the concepts, the more closely related the concepts are. Euclidean distance matrix 1725A uses the indices 1706 of the concepts array for the row and column indices of the matrix. For a given pair of row and column indices into Euclidean distance matrix 1725A, the entry at the intersection of that row and column in Euclidean distance matrix 1725A shows the distance between the concepts with the row and column concept indices, respectively. So, for example, the distance between concepts "man" and "dust" can be found at the intersection of row 1 and column 2 of Euclidean distance matrix 1725A as approximately 1.96 units. The distance between concepts "man" and "iguana" is approximately 1.67, which suggests that "man" is closer to "iguana" than "man" is to "dust." Observe that Euclidean distance matrix 1725A is symmetrical: that is, for an entry in Euclidean distance matrix 1725A with given row and column indices, the row and column indices can be swapped, and Euclidean distance matrix 1725A will yield the same value. In words, this means that the distance between two concepts is not dependent on concept order: the distance from concept "man" to concept "dust" is the same as the distance from concept "dust" to concept "man."

Angle subtended matrix 1725B is an alternative way to store the distance between pairs of concepts. Instead of measuring the distance between the state vectors representing the concepts (see below), the angle between the state vectors representing the concepts is measured. This angle will vary between 0 and 90 degrees. The narrower the angle is between the state vectors representing the concepts, the more closely related the concepts are. As with Euclidean distance matrix 1725A, angle subtended matrix 1725B uses the indices 1706 of the concepts array for the row and column indices of the matrix. For a given pair of row and column indices into angle subtended matrix 1725B, the entry at the intersection of that row and column in angle subtended matrix 1725B shows the angle subtended the state vectors for the concepts with the row and column concept indices, respectively. For example, the angle between concepts "man" and "dust" is approximately 51 degrees, whereas the angle between concepts "man" and "iguana" is approximately 42 degrees. This suggests that "man" is closer to "iguana" than "man" is to "dust." As with Euclidean distance matrix 1725A, angle subtended matrix 1725B is symmetrical.

Not shown in FIG. 17 is a data structure component for storing state vectors (discussed below). As state vectors are used in calculating the distances between pairs of concepts. if the directed set is static (i.e., concepts are not being added or removed and basis chains remain unchanged), the state vectors are not required after distances are calculated. Retaining the state vectors is useful, however, when the directed set is dynamic. A person skilled in the art will recognize how to add state vectors to the data structure of FIG. 17.

Although the data structure for concepts array 1705, maximal element 1710 chains array 1715, and basis chains array 1720 in FIG. 17 are shown as arrays, a person skilled in the art will recognize that other data structures are possible. For example, concepts array could store the concepts in a linked list, maximal element 1710 could use a pointer to point to the maximal element in concepts array 1705, chains array 1715 could use pointers to point to the elements in concepts array, and basis chains array 1720 could use pointers to point to chains in chains array 1715. Also, a person skilled in the art will recognize that the data in Euclidean distance matrix 1725A and angle subtended matrix 1725B can be stored using other data structures. For example. a symmetric matrix can be represented using only one half the space of a full matrix if only the entries below the main diagonal are preserved and the row index is always larger than the column index. Further space can be saved by computing the values of Euclidean distance matrix 1725A and angle subtended matrix 1725B "on the fly" as distances and angles are needed.

Returning to FIGS. 16A–16G, how are distances and angles subtended measured? The chains shown in FIGS. 16A–16G suggest that the relation between any node of the model and the maximal element "thing" 1405 can be expressed as any one of a set of composite functions; one function for each chain from the minimal node $\mu$ to "thing" 1405 (the $n^{th}$ predecessor of $\mu$ along the chain):

$$f: \mu \Rightarrow thing = f_1 \circ f_2 \circ f_3 \circ \ldots \circ f_n$$

where the chain connects n+1 concepts, and $f_j$: links the $(n-j)^{th}$ predecessor of $\mu$ with the $(n+1-j)^{th}$ predecessor of $\mu$, $1 \leq j \leq n$. For example, with reference to FIG. 16A, chain 1605 connects nine concepts. For chain 1605, $f_1$ is link 1605A, $f_2$ is link 1605B, and so on through $f_8$ being link 1605H.

Consider the set of all such functions for all minimal nodes. Choose a countable subset $\{f_k\}$ of functions from the set. For each $f_k$ construct a function $g_k: S \Rightarrow I^1$ as follows. For $s \in S$, s is in relation (under hyponymy) to "thing" 1405. Therefore, s is in relation to at least one predecessor of $\mu$, the minimal element of the (unique) chain associated with $f_k$. Then there is a redecessor of smallest index (of $\mu$), say the $m^{th}$, that is in relation to s. Define:

$$g_k(s) = (n-m)/n \qquad \text{, Equation (1)}$$

This formula gives a measure of concreteness of a concept to a given chain associated with function $f_k$.

As an example of the definition of $g_k$, consider chain 1605 of FIG. 16A, for which n is 8. Consider the concept "cat" 1655. The smallest predecessor of "man" 1410 that is in relation to "cat" 1655 is "being" 1530. Since "being" 1530 is the fourth predecessor of "man" 1410, m is 4, and $g_k$ ("cat" 1655)=(8 –4)8 =mt;epmac;01acx; ac;0/acx; ac;02acx; mx. "Iuana" 1660 and "plant" 1660 similarly have $g_k$ values of 1/2. But the only predecessor of "man" 1410 that is in relation to "adult" 1545 is "thing" 1405 (which is the eighth predecessor of "man" 1410), so m in is 8. and $g_k$ "adult" 1545)=0.

Finally, define the vector valued function $\phi: S \Rightarrow R^k$ relative to the indexed set of scalar functions $\{g_1, g_2, g_3, \ldots, g_k\}$ (where scalar functions $\{g_1, g_2, g_3, \ldots, g_k\}$ are defined according to Equation (1)) as follows:

$$\phi(s) = (g_1(s), g_2(s), g_3(s), \ldots, g_k(s)) \qquad \text{Equation (2)}$$

This state vector $\phi(s)$ maps a concept s in the directed set to a point in k-space ($R^k$). One can measure distances between the points (the state vectors) in k-space. These distances provide measures of the closeness of concepts within the directed set. The means by which distance can be measured include distance functions, such as those shown Equations (3a) (Euclidean distance), (3b) ("city block" distance), or (3c) (an example of another metric). In Equations (3a), (3b), and (3c), $\rho_1 = (n_1, p_1)$ and $\rho_2 = (n_2, p_2)$.

$$|\rho_2 - \rho_1| = (|n_2 - n_1|^2 + |p_2 - p_1|^2)^{1/2} \qquad \text{Equation (3a)}$$

$$|\rho_2 - \rho_1| = |n_2 - n_1| + |p_2 - p_1| \qquad \text{Equation (3b)}$$

$$(\Sigma(\rho_{2,i} - \rho_{1,i})^n)^{1/n} \qquad \text{Equation (3c)}$$

Further, trigonometry dictates that the distance between two vectors is related to the angle subtended between the two vectors, so means that measure the angle between the state vectors also approximates the distance between the state vectors. Finally, since only the direction (and not the magnitude) of the state vectors is important, the state vectors can be normalized to the unit sphere. If the state vectors are normalized, then the angle between two state vectors is no longer an approximation of the distance between the two state vectors, but rather is an exact measure.

The functions $g_k$ are analogous to step functions, and in the limit (of refinements of the topology) the functions are continuous. Continuous functions preserve local topology; i.e., "close things" in S map to "close things" in $R^k$, and "far things" in S tend to map to "far things" in $R^k$.

Example Results

The following example results show state vectors $\phi(s)$ using chain 1605 as function $g_1$, chain 1610 as function $g_2$, and so on through chain 1640 as function $g_8$.

$\phi(\text{"boy"}) \Rightarrow (3/4, 5/7, 4/5, 3/4, 7/9, 5/6, 1, 7/6)$ $\phi(\text{"dust"}) \Rightarrow (3/8, 3/7, 3/10, 1, 1/9, 0, 0, 0)$ $\phi(\text{"iguana"}) \Rightarrow (1/2, 1, 1/2, 3/4, 5/9, 0, 0, 0)$ $\phi(\text{"woman"}) \Rightarrow (7/8, 5/7, 9/10, 3/4, 8/9, 2/3, 5/7, 5/7)$ $\phi(\text{"man"}) \Rightarrow (1, 5/7, 1, 3/4, 1, 1, 5/7, 5/7)$ using these stae vectors, the distances between concepts and the angles subtended between the state vectors are as follows:

| Pairs of Concepts | Distance (Euclidean) | Angle Subtended |
| --- | --- | --- |
| "boy" and "dust" | ~1.85 | ~52° |
| "boy" and "iguana" | ~1.65 | ~46° |
| "boy" and "woman" | ~0.41 | ~10° |
| "dust" and "iguana" | ~0.80 | ~30° |
| "dust" and "woman" | ~1.68 | ~48° |
| "iguana" and "woman" | ~1.40 | ~39° |
| "man" and "woman" | ~0.39 | ~07° |

From these results, the following comparisons can be seen:
- "boy" is closer to "iguana" than to "dust."
- "boy" is closer to "iguana" than "woman" is to "dust"
- "boy" is much closer to "woman" than to "iguana" or "dust."
- "dust" is further from "iguana" than "boy" to "woman" or "man" to "woman"
- "woman" is closer to "iguana" than to "dust."
- "woman" is closer to "iguana" than "boy" is to "dust."
- "man" is closer to "woman" than "boy" is to "woman."
- All other tests done to date yield similar results. The techniciue works consistently well.

Figure 1:
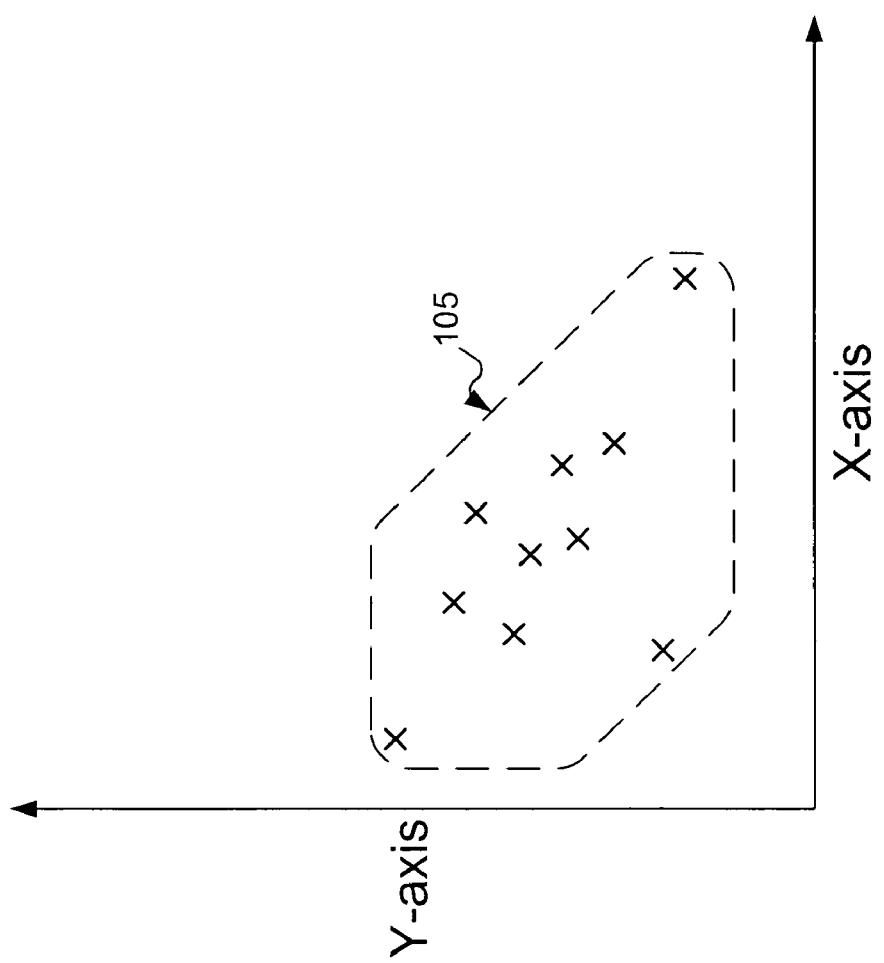
FIG. 1 shows a two-dimensional topological vector space in which state vectors are used to determine a semantic abstract for a document.

FIG. 1 shows a two-dimensional topological vector space in which state vectors are used to construct a semantic abstract for a document. (FIG. 1 and FIGS. 2 and 3 to follow, although accurate representations of a topological vector space, are greatly simplified for example purposes, since most topological vector spaces will have significantly higher dimensions.) In FIG. 1, the "x" symbols locate the heads of state vectors for terms in the document. (For clarity, the line segments from the origin of the topological vector space to the heads of the state vectors are not shown in FIG. 1.) Semantic abstract 105 includes a set of vectors for the document. As can be seen, most of the state vectors for this document fall within a fairly narrow area of semantic abstract 105. Only a few outliers fall outside the main part of semantic abstract 105.

Now that semantic abstracts have been defined, two questions remain: what words are selected to be mapped into state vectors in the semantic abstract, and how is distance measured between semantic abstracts. The first question will be put aside for the moment and returned to later.

Revisiting Semantic Distance

Recall that in the Construction application it was shown that $\mathcal{H}(S)$ is the set of all compact (non-empty) subsets of a metrizable space S. The Hausdorff distance h is defined as follows: Define the pseudo-distance $\xi(x, u)$ between the point $x \in S$ and the set $u \in \mathcal{H}(S)$ as $\xi(x,u)=\min\{d(x,y):y \in u\}$.

Using $\xi$ define another pseudo-distance $\lambda(u, v)$ from the set $u \in \mathcal{H}(S)$ to the set $v \in \mathcal{H}(S)$:

$\lambda(u,v)=\max\{\xi(x,v):x \in u\}$.

Note that in general it is not true that $\lambda(u, v)=\lambda(v, u)$. Finally, define the distance $h(u, v)$ between the two sets $u, v \in \mathcal{H}(S)$ as $h(u,v)=\max\{\lambda(u,v),\lambda(v,u)\}$.

The distance function h is called the Hausdorff distance. Note that $h(u,v)=h(v,u)$, $0<h(u,v)<\infty$ for all $u,v \in \mathcal{H}(S), u \neq v$, $h(u,u)=0$ for all $u \in \mathcal{H}(S)$, and $h(u,v) \leq h(u,w)+h(w,v)$ for all u, v, w $\in \mathcal{H}(S)$.

Measuring Distance Between Semantic Abstracts

Figure 2:
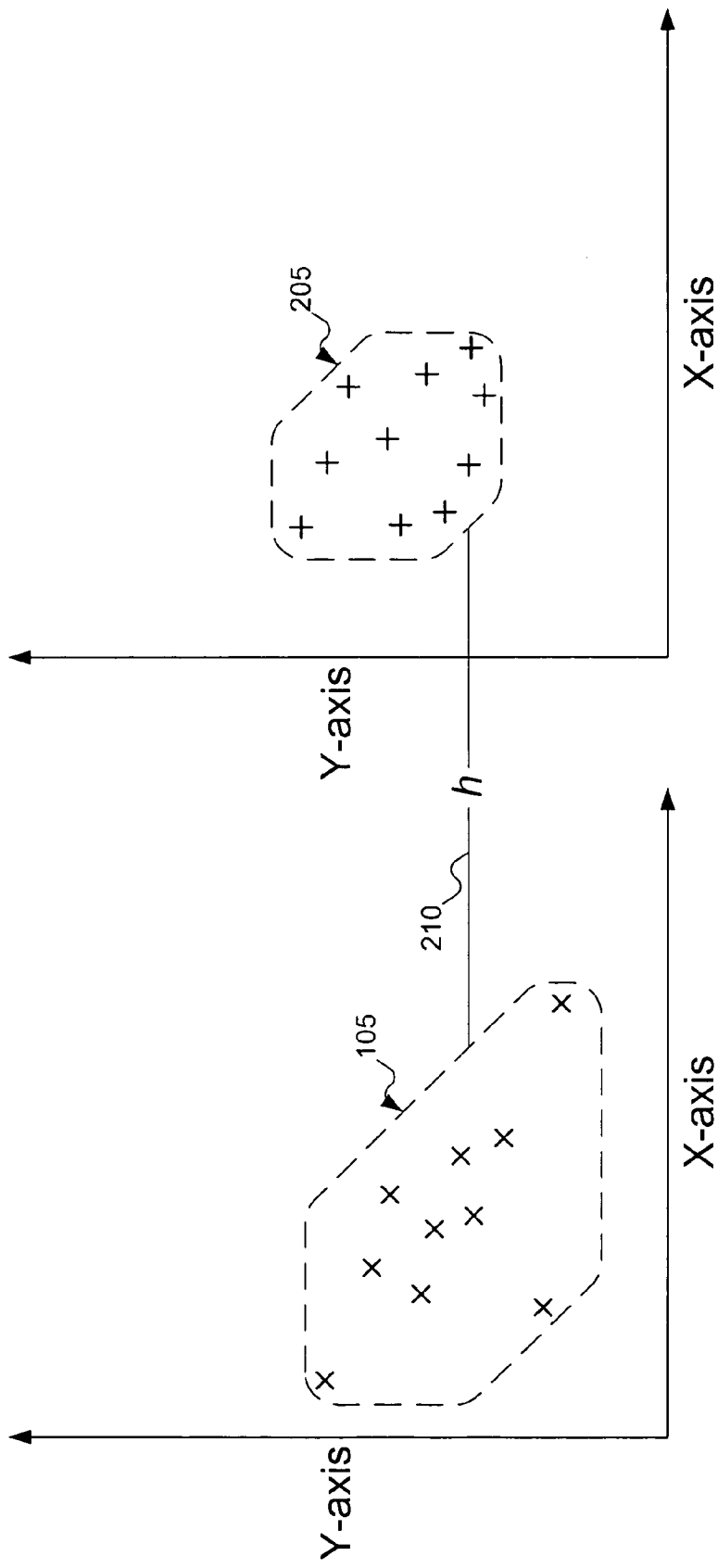
FIG. 2 shows a two-dimensional topological vector space in which semantic abstracts for two documents are compared by measuring the Hausdorff distance between the semantic abstracts.

If $\mathcal{H}(S)$ is the topological vector space and u and v are semantic abstracts in the topological vector space, then Hausdorff distance function h provides a measure of the distance between semantic abstracts. FIG. 2 shows a two-dimensional topological vector space in which semantic abstracts for two documents are compared. (To avoid clutter in the drawing, FIG. 2 shows the two semantic abstracts in different graphs of the topological vector space. The reader can imagine the two semantic abstracts as being in the same graph.) In FIG. 2, semantic abstracts 105 and 205 are shown. Semantic abstract 105 can be the semantic abstract for the known document; semantic abstract 205 can be a semantic abstract for a document that may be similar to the document associated with semantic abstract 105. Using the Hausdorff distance function h, the distance 210 between semantic abstracts 105 and 205 can be quantified. Distance 210 can then be compared with a classification scale to determine how similar the two documents are.

Figure 3:
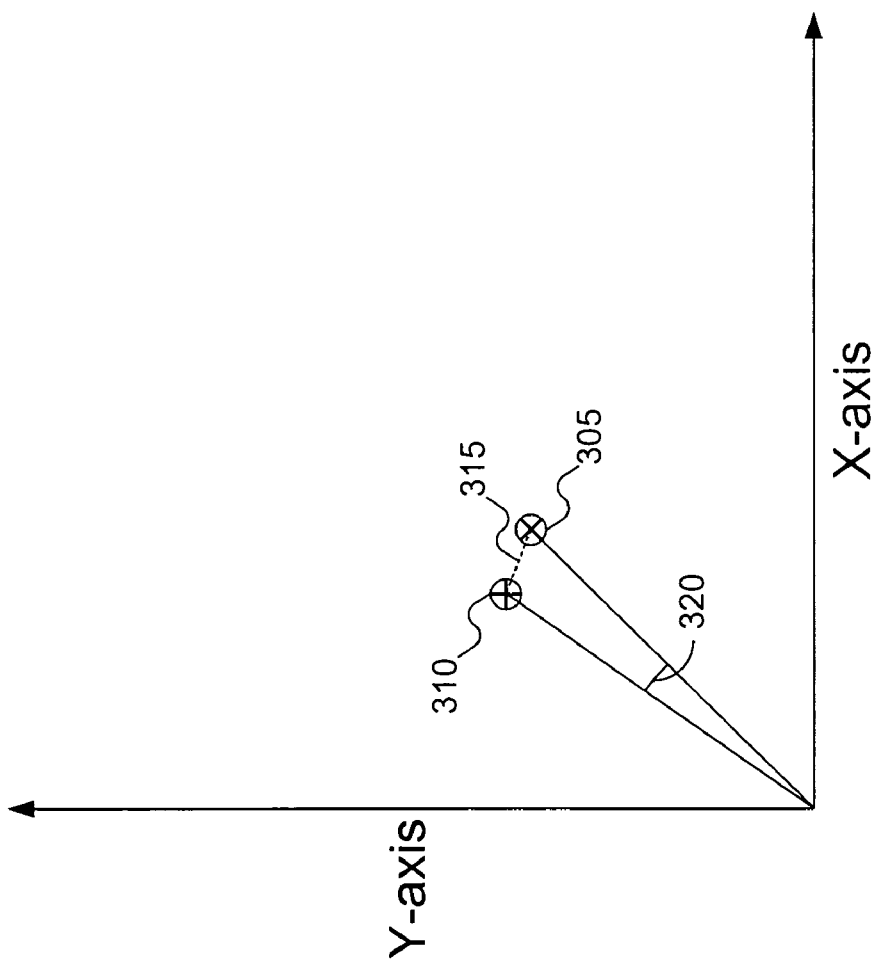
FIG. 3 shows a two-dimensional topological vector space in which the semantic abstracts for the documents of FIG. 2 are compared by measuring the angle and/or distance between centroid vectors for the semantic abstracts.

Although the preferred embodiment uses the Hausdorff distance function h to measure the distance between semantic abstracts, a person skilled in the art will recognize that other distance functions can be used. For example, FIG. 3 shows two alternative distance measures for semantic abstracts. In FIG. 3, the semantic abstracts 105 and 205 have been reduced to a single vector. Centroid 305 is the center of semantic abstract 105, and centroid 310 is the center of semantic abstract 205. (Centroids 305 and 310 can be defined using any measure of central tendency.) The distance between centroids 305 and 310 can be measured directly as distance 315, or as angle 320 between the centroid vectors.

As discussed in the Construction application, different dictionaries and bases can be used to construct the state vectors. It may happen that the state vectors comprising each semantic abstract are generated in different dictionaries or bases and therefore are not directly comparable. But by using a topological vector space transformation, the state vectors for one of the semantic abstracts can be mapped to state vectors in the basis for the other semantic abstract, allowing the distance between the semantic abstracts to be calculated. Alternatively, each semantic abstract can be mapped to a normative, preferred dictionary/basis combination.

Which Words?

Now that the question of measuring distances between semantic abstracts has been addressed, the question of selecting the words to map into state vectors for the semantic abstract can be considered.

In one embodiment, the state vectors in semantic abstract 105 are generated from all the words in the document. Generally, this embodiment will produce a large and unwieldy set of state vectors. The state vectors included in semantic abstract 105 can be filtered from the dominant context. A person skilled in the art will recognize several ways in which this filtering can be done. For example, the state vectors that occur with the highest frequency, or with a frequency greater than some threshold frequency, can be selected for semantic abstract 105. Or those state vectors closest to the center of the set can be selected for semantic abstract 105. Other filtering methods are also possible. The set of state vectors, after filtering, is called the dominant vectors.

In another embodiment, a phrase extractor is used to examine the document and select words representative of the context of the document. These selected words are called dominant phrases. Typically, each phrase will generate more than one state vector, as there are usually multiple lexemes in each phrase. But if a phrase includes only one lexeme, it will map to a single state vector. The state vectors in semantic abstract 105 are those corresponding to the selected dominant phrases. The phrase extractor can be a commercially available tool or it can be designed specifically to support the invention. Only its function (and not its implementation) is relevant to this invention. The state vectors corresponding to the dominant phrases are called dominant phrase vectors.

The semantic abstract is related to the level of abstraction used to generate the semantic abstract. A semantic abstract that includes more detail will generally be larger than a semantic abstract that is more general in nature. For example, an abstract that measures to the concept of "person" will be smaller and more abstract than one that measures to "man," "woman," "boy," "girl," etc. By changing the selection of basis vectors and/or dictionary when generating the semantic abstract, the user can control the level of abstraction of the semantic abstract.

Despite the fact that different semantic abstracts can have different levels of codified abstraction, the semantic abstracts can still be compared directly by properly manipulating the dictionary (topology) and basis vectors of each semantic space being used. All that is required is a topological vector space transformation to a common topological vector space. Thus, semantic abstracts that are produced by different authors, mechanisms, dictionaries, etc. yield to comparison via the invention.

Systems for Building and Using Semantic Abstracts

Figure 4:
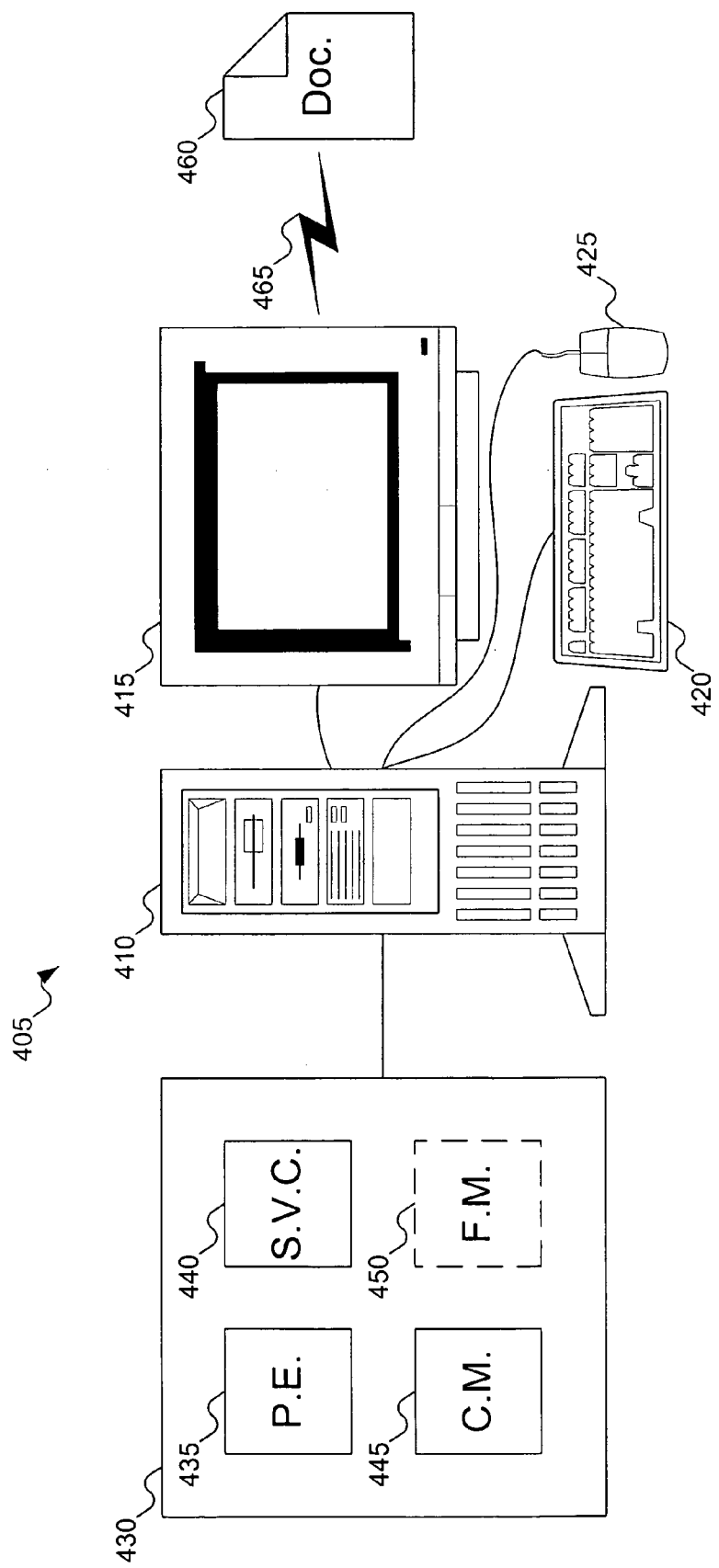
FIG. 4 shows a computer system on which the invention can operate to construct semantic abstracts.

FIG. 4 shows a computer system 405 on which a method and apparatus for using a multi-dimensional semantic space can operate. Computer system 405 conventionally includes a computer 410, a monitor 415, a keyboard 420, and a mouse 425. But computer system 405 can also be an Internet appliance, lacking monitor 415, keyboard 420, or mouse 425. Optional equipment not shown in FIG. 4 can include a printer and other input/output devices. Also not shown in FIG. 4 are the conventional internal components of computer system 405: e.g., a central processing unit, memory, file system, etc.

Computer system 405 further includes software 430. In FIG. 4, software 430 includes phrase extractor 435, state vector constructor 440, and collection means 445. Phrase extractor 435 is used to extract phrases from the document. Phrases can be extracted from the entire document, or from only portions (such as one of the document's abstracts or topic sentences of the document). Phrase extractor 435 can also be a separate, commercially available piece of software designed to scan a document and determine the dominant phrases within the document. Commercially available phrase extractors can extract phrases describing the document that do not actually appear within the document. The specifics of how phrase extractor 435 operates are not significant to the invention: only its function is significant. Alternatively, phrase extractor can extract all of the words directly from the document, without attempting to determine the "important" words.

State vector constructor 440 takes the phrases determined by phrase extractor 435 and constructs state vectors for the phrases in a topological vector space. Collection means 445 collects the state vectors and assembles them into a semantic abstract.

Computer system 405 can also include filtering means 450. Filtering means 450 reduces the number of state vectors in the semantic abstract to a more manageable size. In the preferred embodiment, filtering means 450 produces a model that is distributed similarly to the original state vectors in the topological vector space: that is, the probability distribution function of the filtered semantic abstract should be similar to that of the original set of state vectors.

It is possible to create semantic abstracts using both commercially available phrase extractors and the words of the document. When both sources of phrases are used, filtering means 450 takes on a slightly different role. First, since there are three sets of state vectors involved (those generated from phrase extractor 435, those generated from the words of the document, and the final semantic abstract), terminology can be used to distinguish between the two results. As discussed above, the phrases extracted by the commercially available phrase extractor are called dominant phrases, and the state vectors that result from the dominant phrases are called dominant phrase vectors. The state vectors that result from the words of the document are called dominant vectors. Filtering means 450 takes both the dominant phrase vectors and the dominant vectors, and produces a set of vectors that constitute the semantic abstract for the document. This filtering can be done in several ways. For example, the dominant phrase vectors can be reduced to those vectors with the highest frequency counts within the dominant phrase vectors. The filtering can also reduce the dominant vectors based on the dominant phrase vectors. The dominant vectors and the dominant phrase vectors can also be merged into a single set, and that set reduced to those vectors with the greatest frequency of occurrence. A person skilled in the art will also recognize other ways the filtering can be done.

Although the document operated on by phrase extractor 435 can be found stored on computer system 405, this is not required. FIG. 4 shows computer system 405 accessing document 460 over network connection 465. Network connection 465 can include any kind of network connection. For example, network connection 465 can enable computer system 405 to access document 460 over a local area network (LAN), a wide area network (WAN), a global internetwork, or any other type of network. Similarly, once collected, the semantic abstract can be stored somewhere on computer system 405, or can be stored elsewhere using network connection 465.

Figure 5:
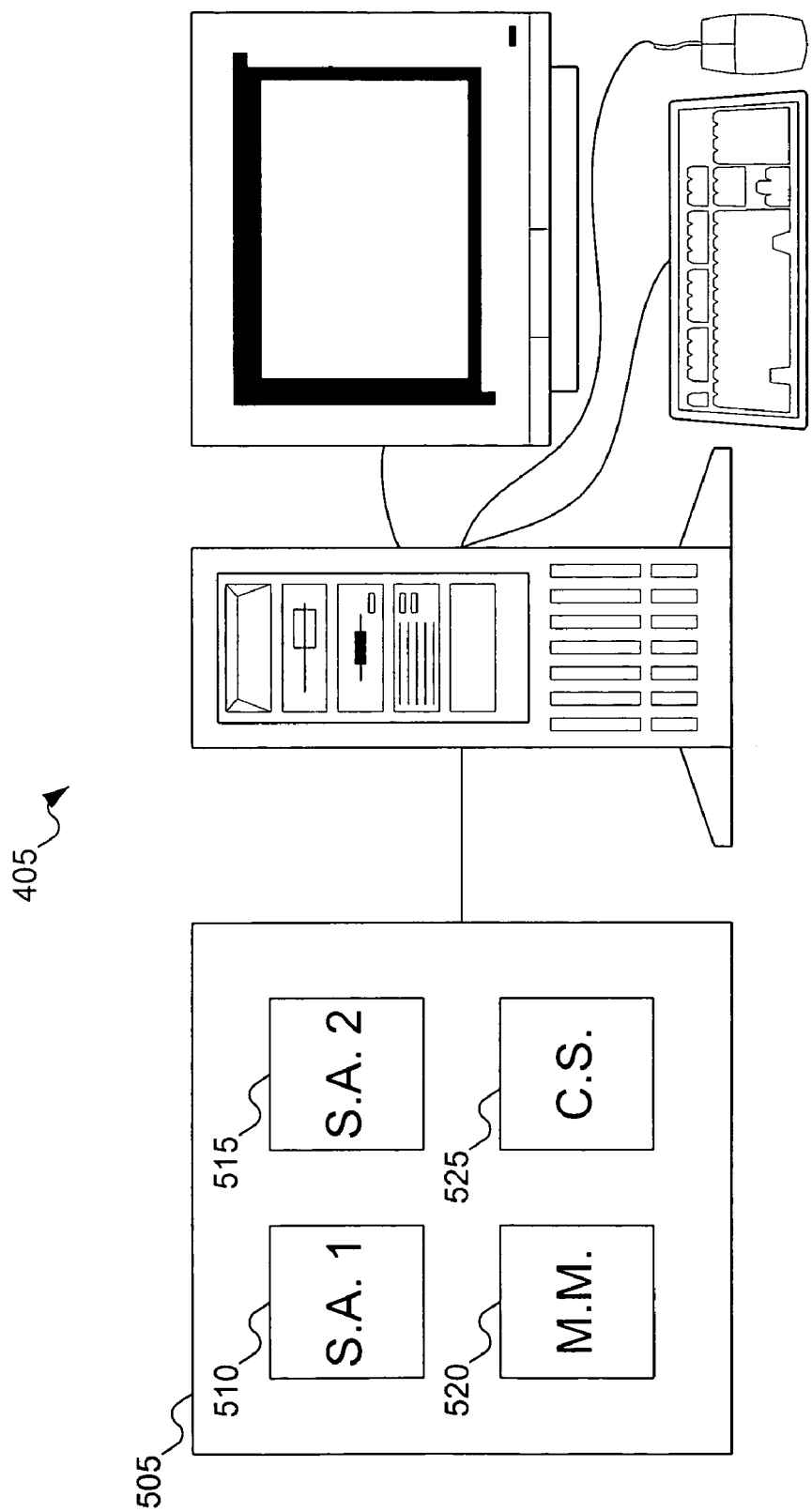
FIG. 5 shows a computer system on which the invention can operate to compare the semantic abstracts of two documents.

FIG. 5 shows computer system 405 equipped with software 505 to compare semantic abstracts for two documents. Software 505 includes semantic abstracts 510 and 515 for the two documents being compared, measurement means 520 to measure the distance between the two semantic abstracts, and classification scale 525 to determine how "similar" the two semantic abstracts are.

Procedural Implementation

Figure 6:
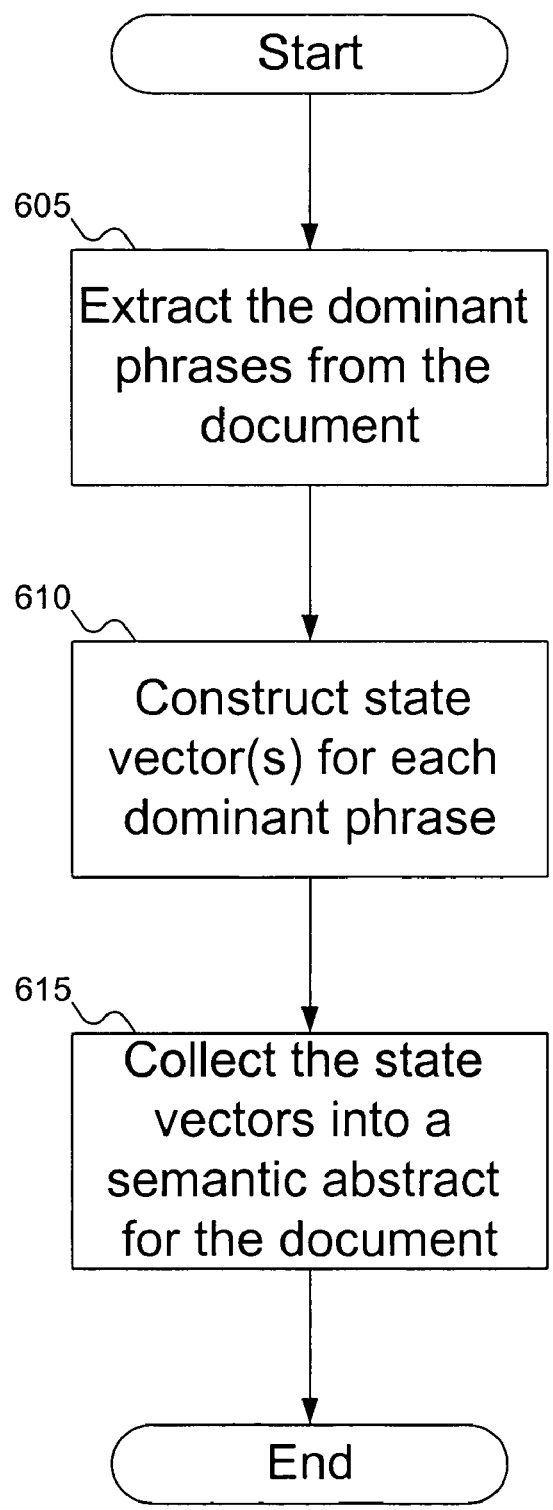
FIG. 6 shows a flowchart of a method to determine a semantic abstract for a document in the system of FIG. 4 by extracting the dominant phrases from the document.

FIG. 6 is a flowchart of a method to construct a semantic abstract for a document in the system of FIG. 4 based on the dominant phrase vectors. At step 605, phrases (the dominant phrases) are extracted from the document. As discussed above, the phrases can be extracted from the document using a phrase extractor. At step 610, state vectors (the dominant phrase vectors) are constructed for each phrase extracted from the document. As discussed above, there can be more than one state vector for each dominant phrase. At step 615, the state vectors are collected into a semantic abstract for the document.

Note that phrase extraction (step 605) can be done at any time before the dominant phrase vectors are generated. For example, phrase extraction can be done when the author generates the document. In fact, once the dominant phrases have been extracted from the document, creating the dominant phrase vectors does not require access to the document at all. If the dominant phrases are provided, the dominant phrase vectors can be constructed without any access to the original document.

Figure 7:
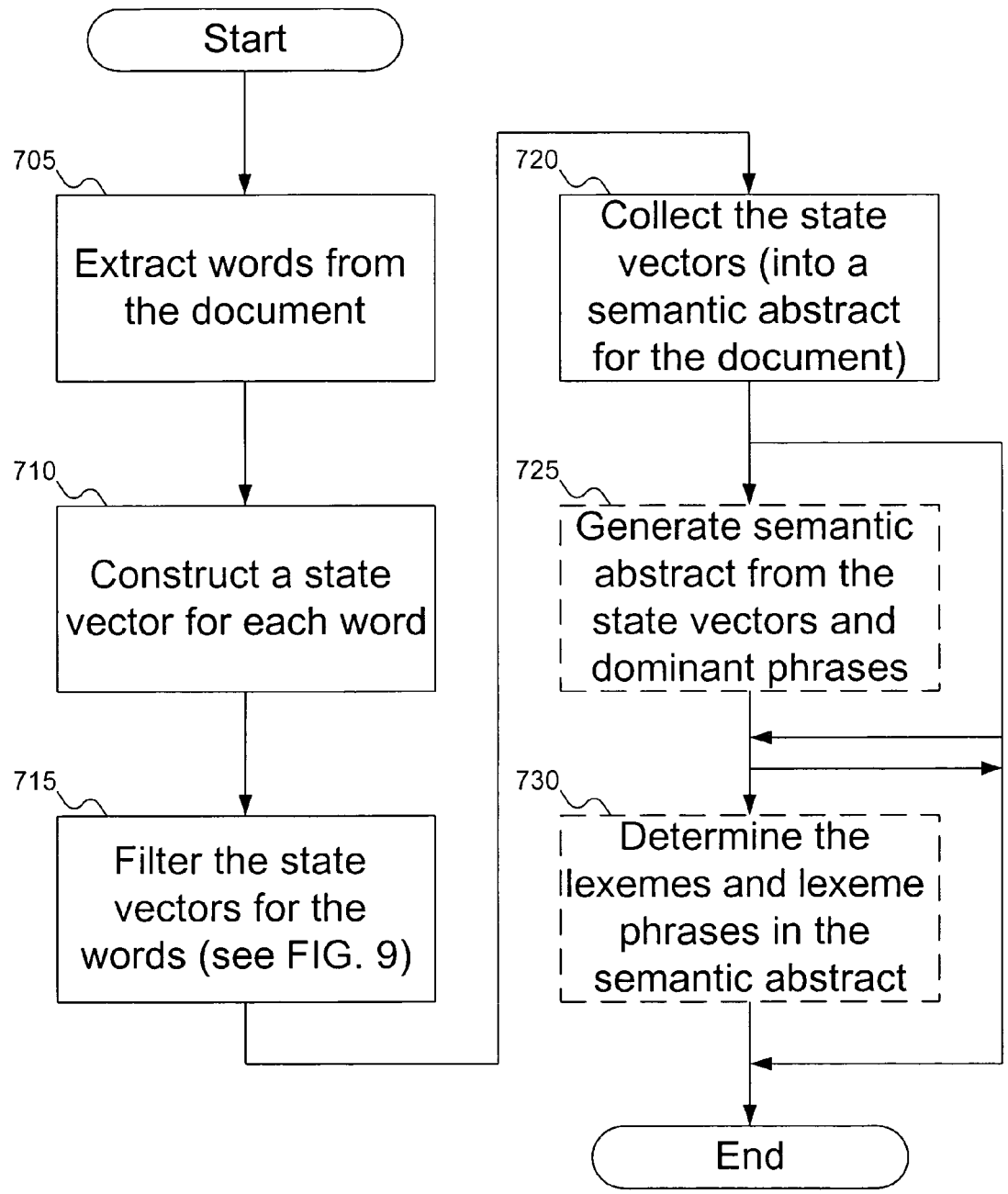
FIG. 7 shows a flowchart of a method to determine a semantic abstract for a document in the system of FIG. 4 by determining the dominant context of the document.

FIG. 7 is a flowchart of a method to construct a semantic abstract for a document in the system of FIG. 4 based on the dominant vectors. At step 705, words are extracted from the document. As discussed above, the words can be extracted from the entire document or only portions of the document (such as one of the abstracts of the document or the topic sentences of the document). At step 710, a state vector is constructed for each word extracted from the document. At step 715, the state vectors are filtered to reduce the size of the resulting set, producing the dominant vectors. Finally, at step 720, the filtered state vectors are collected into a semantic abstract for the document.

As also shown in FIG. 7, two additional steps are possible, and are included in the preferred embodiment. At step 725, the semantic abstract is generated from both the dominant vectors and the dominant phrase vectors. As discussed above, the semantic abstract can be generated by filtering the dominant vectors based on the dominant phrase vectors, by filtering the dominant phrase vectors based on the dominant vectors, or by combining the dominant vectors and the dominant phrase vectors in some way. Finally, at step 730, the lexeme and lexeme phrases corresponding to the state vectors in the semantic abstract are determined. Since each state vector corresponds to a single lexeme or lexeme phrase in the dictionary used, this association is easily accomplished.

As discussed above regarding phrase extraction in FIG. 6, the dominant vectors and the dominant phrase vectors can be generated at any time before the semantic abstract is created.

Once the dominant vectors and dominant phrase vectors are created, the original document is not required to construct the semantic abstract.

Figure 8:
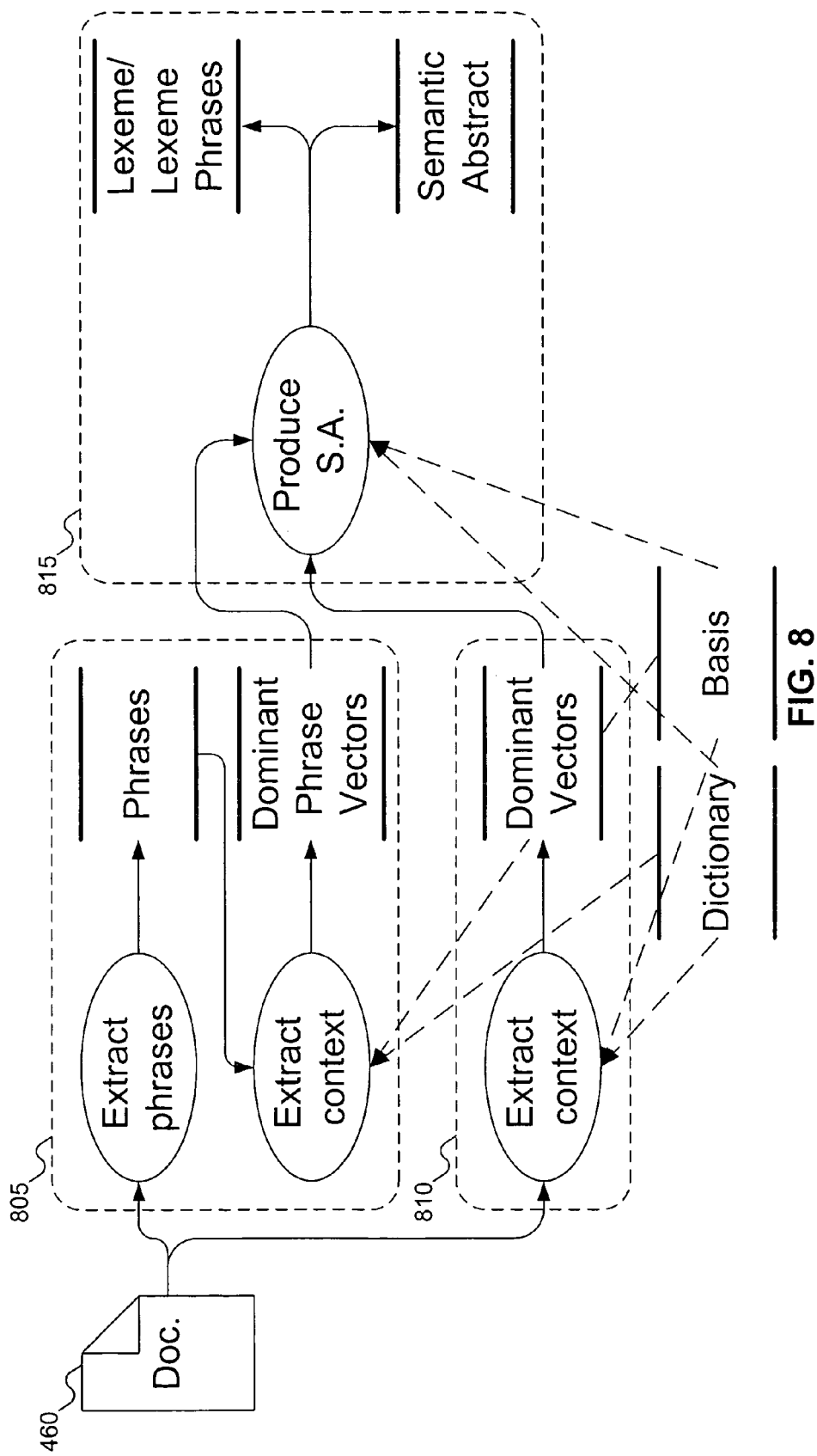
FIG. 8 shows a dataflow diagram for the creation of a semantic abstract as described in FIG. 7.

FIG. 8 shows a dataflow diagram showing how the flowcharts of FIGS. 6 and 7 operate on document 460. Operation 805 corresponds to FIG. 6. Phrases are extracted from document 460, which are then processed into dominant phrase vectors. Operation 810 corresponds to steps 705, 710, and 715 from FIG. 7. Words in document 460 are converted and filtered into dominant vectors. Finally, operation 815 corresponds to steps 720, 725, and 730 of FIG. 7. The dominant phrase vectors and dominant vectors are used to produce the semantic abstract and the corresponding lexemes and lexeme phrases.

Figure 9:
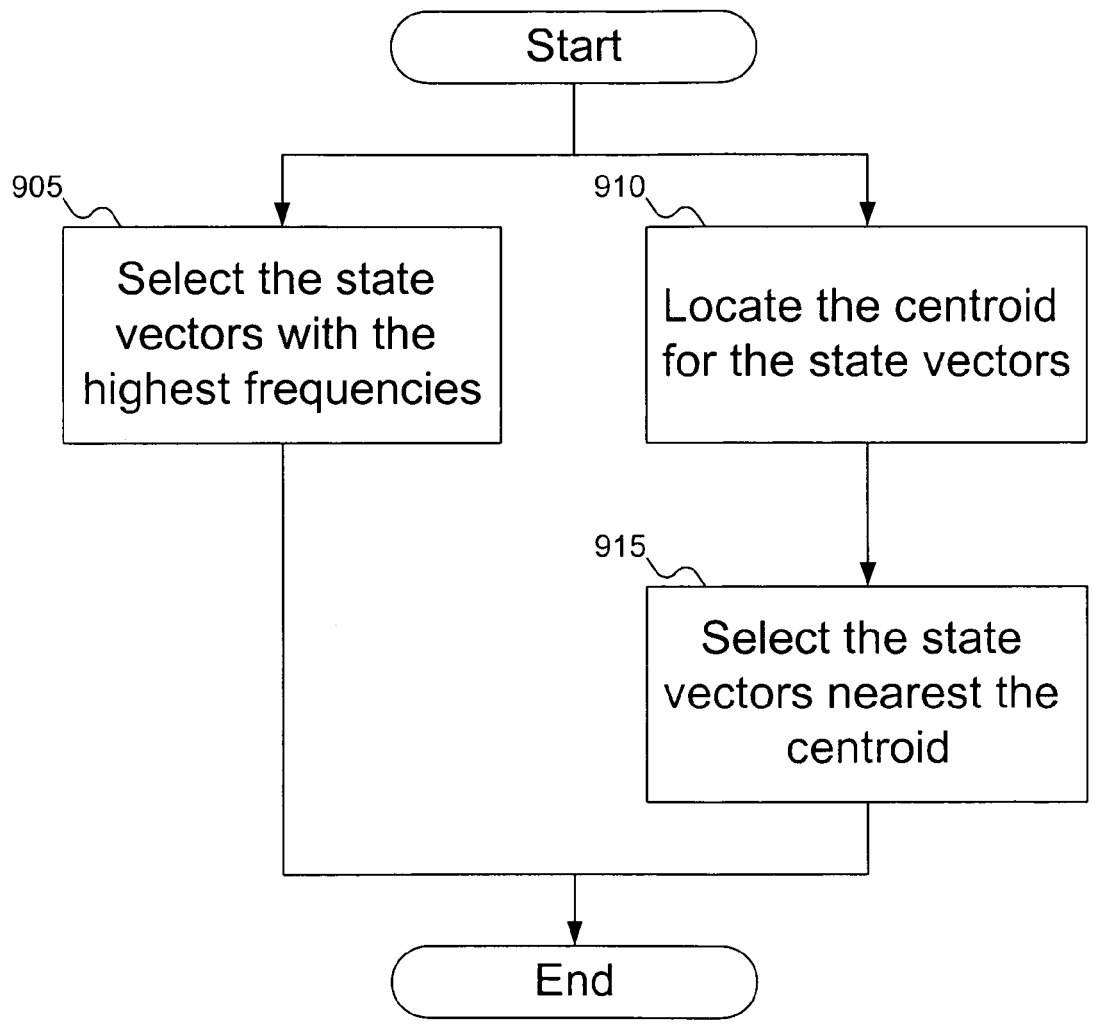
FIG. 9 shows a flowchart showing detail of how the filtering step of FIG. 7 can be performed.

FIG. 9 shows more detail as to how the dominant vectors are filtered in step 715 of FIG. 7. As shown by step 905, the state vectors with the highest frequencies can be selected. Alternatively, as shown by steps 910 and 915, the centroid of the set of state vectors can be located, and the vectors closest to the centroid can be selected. (As discussed above, any measure of central tendency can be used to locate the centroid.) A person skilled in the art will also recognize other ways the filtering can be performed.

Figure 10:
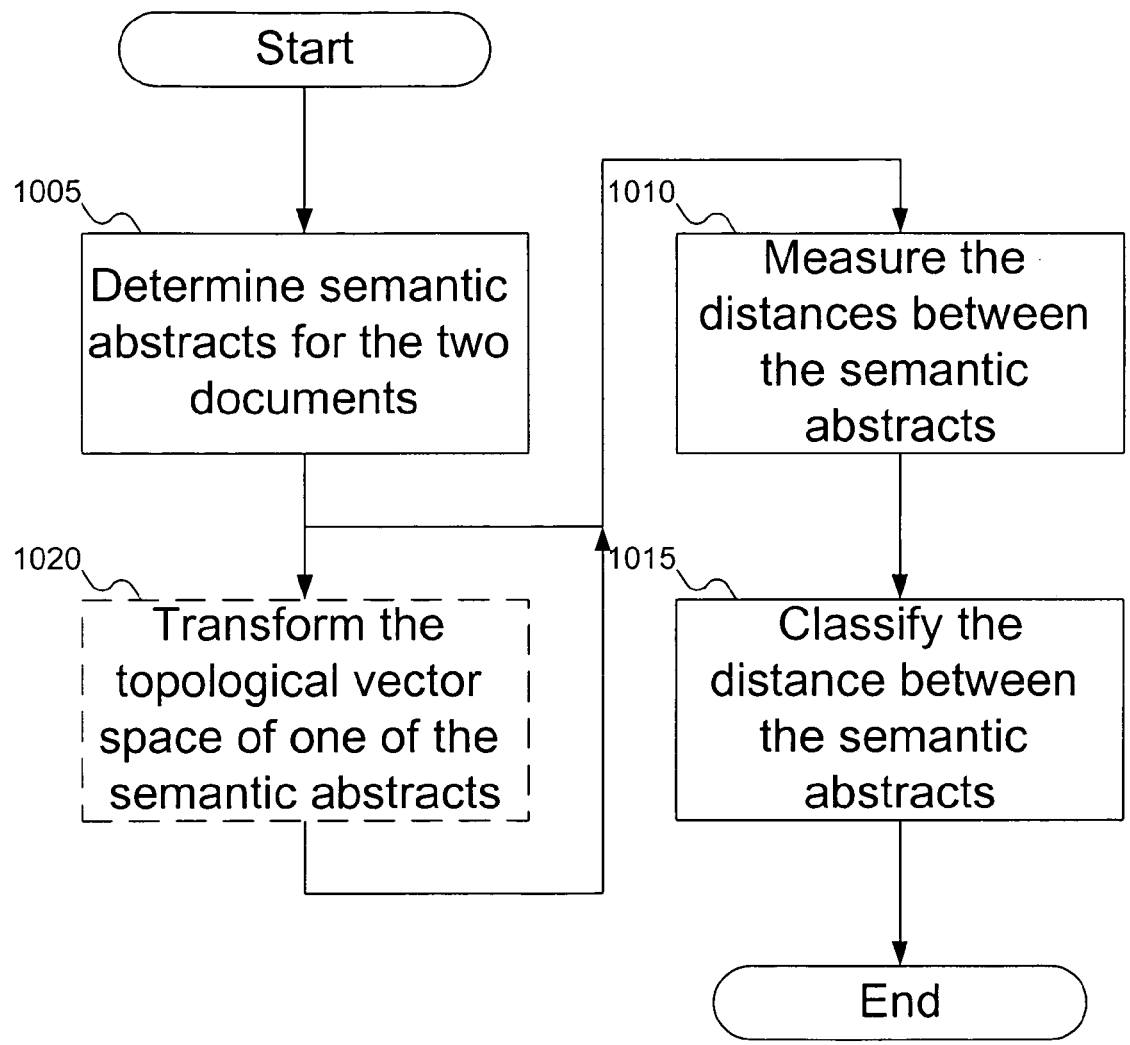
FIG. 10 shows a flowchart of a method to compare two semantic abstracts in the system of FIG. 5.

FIG. 10 is a flowchart of a method to compare two semantic abstracts in the system of FIG. 5. At step 1005 the semantic abstracts for the documents are determined. At step 1010, the distance between the semantic abstracts is measured. As discussed above, distance can be measured using the Hausdorff distance function h. Alternatively, the centroids of the semantic abstracts can be determined and the distance or angle measured between the centroid vectors. Finally, at step 1015, the distance between the state vectors is used with a classification scale to determine how closely related the contents of the documents are.

As discussed above, the state vectors may have been generated using different dictionaries or bases. In that case, the state vectors cannot be compared without a topological vector space transformation. This is shown in step 1020. After the semantic abstracts have been determined and before the distance between them is calculated, a topological vector space transformation can be performed to enable comparison of the semantic abstracts. One of the semantic abstracts can be transformed to the topological vector space of the other semantic abstract, or both semantic abstracts can be transformed to a normative, preferred basis.

Figure 11:
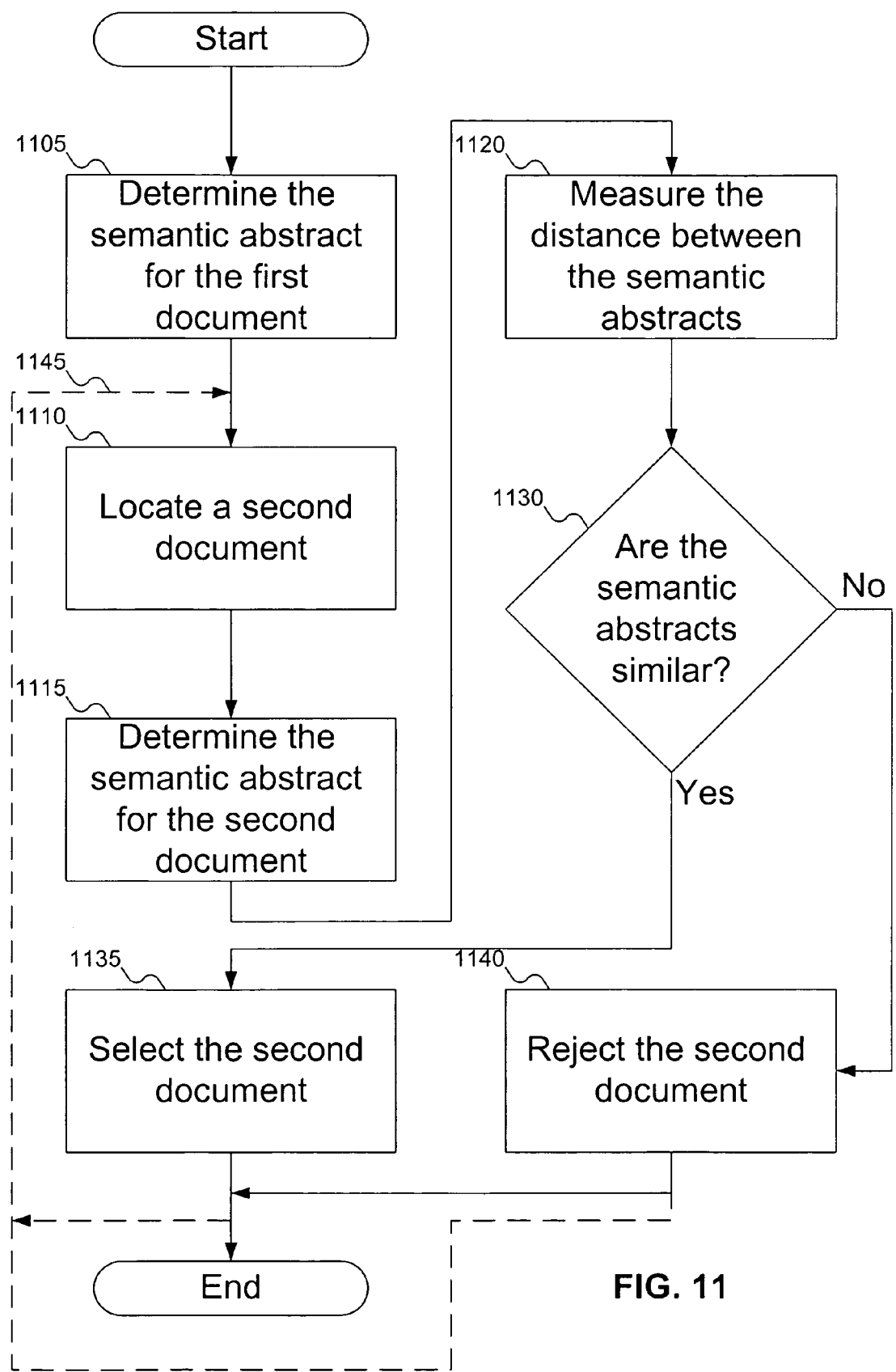
FIG. 11 shows a flowchart of a method in the system of FIG. 4 to locate a document with content similar to a given document by comparing the semantic abstracts of the two documents in a topological vector space.

FIG. 11 is a flowchart of a method to search for documents with semantic abstracts similar to a given document in the system of FIG. 5. At step 1105, the semantic abstract for the given document is determined. At step 1110, a second document is located. At step 1115, a semantic abstract is determined for the second document. At step 1120, the distance between the semantic abstracts is measured. As discussed above, the distance is preferably measured using the Hausdorff distance function h, but other distance functions can be used. At step 1130, the distance between the semantic abstracts is used to determine if the documents are similar. If the semantic abstracts are similar, then at step 1135 the second document is selected. Otherwise, at step 1140 the second document is rejected.

Whether the second document is selected or rejected, the process can end at this point. Alternatively, the search can continue by returning to step 1110, as shown by dashed line 1145. If the second document is selected, the distance between the given and second documents can be preserved. The preserved distance can be used to rank all the selected documents, or it can be used to filter the number of selected documents. A person skilled in the art will also recognize other uses for the preserved distance.

Note that, once the semantic abstract is generated, it can be separated from the document. Thus, in FIG. 11, step 1105 may simply include loading the saved semantic abstract. The document itself may not have been loaded or even may not be locatable. FIG. 12 shows saved semantic abstract 1202 for a document. In FIG. 12, semantic abstract 1202 is saved; the semantic abstract can be saved in other formats (including proprietary formats). Semantic abstract 1202 includes document reference 1205 from which the semantic abstract was generated, vectors 1210 comprising the semantic abstract, and dictionary reference 1215 and basis reference 1220 used to generate vectors 1210. Document reference 1205 can be omitted when the originating document is not known.

FIG. 13 shows document search request 1302. Document search request 1302 shows how a search for documents with content similar to a given document can be formed. Document search request 1302 is formed using HTTP, but other formats can be used. Document search request 1302 includes list 1305 of documents to search, vectors 1310 forming the semantic abstract, dictionary reference 1315 and basis reference 1320 used to generate vectors 1310, and acceptable distances 1325 for similar documents. Note that acceptable distances 1325 includes both minimum and maximum acceptable distances. But a person skilled in the art will recognize that only a minimum or maximum distance is necessary, not both.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A method for determining dominant phrase vectors in a topological vector space for a semantic content of a document on a computer system, the method comprising:
   identifying a directed set of concepts as a dictionary, the directed set including a maximal element and at least one concept, and at least one chain from the maximal element to every concept;
   selecting a subset of the chains to form a basis for the dictionary;
   accessing dominant phrases for the document, the dominant phrases representing a condensed content for the document;
   measuring how concretely each dominant phrase is represented in each chain in the basis and the dictionary;
   constructing at least one state vector in the topological vector space for each dominant phrase using the measures of how concretely each dominant phrase is represented in each chain in the dictionary and the basis; and
   collecting the state vectors into the dominant phrase vectors for the document.

2. A method according to claim 1, wherein accessing dominant phrases includes extracting the dominant phrases from the document using a phrase extractor.

3. A method according to claim 1, wherein accessing dominant phrases includes storing the dominant phrases in computer memory accessible by the computer system.

4. A method according to claim 1, the method further comprising forming a semantic abstract comprising the dominant phrase vectors.

5. A method according to claim 1, wherein:
   measuring how concretely each dominant phrase is represented in each chain in the basis and the dictionary includes:
      identifying at least one lexeme in each dominant phrase; and
      measuring how concretely each lexeme in each dominant phrase is represented in each chain in the basis and the dictionary; and
   constructing at least one state vector in the topological vector space for each dominant phrase includes constructing at least one state vector in the topological vector space for each lexeme in each dominant phrase using the measures of how concretely each lexeme in each dominant phrase is represented in each chain in the basis and the dictionary.

6. A method according to claim 1, wherein constructing at least one state vector includes constructing the state vectors in the topological vector space for each dominant phrase using the measures of how concretely each dominant phrase is represented in each chain in the dictionary and the basis, the state vectors independent of the document.

7. A method for determining dominant vectors in a topological vector space for a semantic content of a document on a computer system, the method comprising:
   identifying a directed set of concepts as a dictionary, the directed set including a maximal element and at least one concept, and at least one chain from the maximal element to every concept;
   selecting a subset of the chains to form a basis for the dictionary;
   storing the document in computer memory accessible by the computer system;
   extracting words from at least a portion of the document;
   measuring how concretely each word is represented in each chain in the basis and the dictionary;
   constructing a state vector in the topological vector space for each word using the measures of how concretely each word is represented in each chain in the dictionary and the basis;
   filtering the state vectors; and
   collecting the filtered state vectors into the dominant vectors for the document.

8. A method according to claim 7, wherein extracting words includes extracting words from the entire document.

9. A method according to claim 7, wherein filtering the state vectors includes selecting the state vectors that occur with highest frequencies.

10. A method according to claim 7, wherein filtering the state vectors includes:
    calculating a centroid in the topological vector space for the state vectors; and
    selecting the state vectors nearest the centroid.

11. A method according to claim 7, the method further comprising forming a semantic abstract comprising the dominant vectors.

12. A computer-readable medium containing a program to determine dominant vectors in a topological vector space for a semantic content of a document on a computer system, the program being executable on the computer system to implement the method of claim 7.

13. A method according to claim 7, wherein constructing a state vector includes constructing the state vector in the topological vector space for each word using the measures of how concretely each word is represented in each chain in the dictionary and the basis, the state vectors independent of the document.

14. A method for determining a semantic abstract in a topological vector space for a semantic content of a document on a computer system, the method comprising:
   identifying a directed set of concepts as a dictionary, the directed set including a maximal element and at least one concept, and at least one chain from the maximal element to every concept;
   selecting a subset of the chains to form a basis for the dictionary;
   storing the document in computer memory accessible by the computer system;
   determining dominant phrases for the document;
   measuring how concretely each dominant phrase is represented in each chain in the basis and the dictionary;
   constructing dominant phrase vectors in the topological vector space for the dominant phrases using the measures of how concretely each dominant phrase is represented in each chain in the dictionary and the basis;
   selecting words for the document;
   measuring how concretely each word is represented in each chain in the basis and the dictionary;
   constructing dominant vectors in the topological vector space for the words using the measures of how concretely each word is represented in each chain in the dictionary and the basis; and
   generating the semantic abstract using the dominant phrase vectors and the dominant vectors.

15. A method according to claim 14, wherein generating the semantic abstract includes reducing the dominant phrase vectors based on the dominant vectors.

16. A method according to claim 15, wherein constructing at least one state vector includes constructing at least one state vector for the first document in the topological vector space for each dominant phrase for the first document using the measures of how concretely each dominant phrase for the first document is represented in each chain in the dictionary and the basis, the state vectors independent of the first document and the second document.

17. A method according to claim 14, wherein generating the semantic abstract includes reducing the dominant vectors based on the dominant phrase vectors.

18. A method according to claim 14, wherein generating the semantic abstract includes obtaining a probability distribution function for a reduced set of the dominant phrase vectors similar to a probability distribution function for the dominant phrase vectors.

19. A method according to claim 14, the method further comprising identifying the lexemes or lexeme phrases corresponding to state vectors in the semantic abstract.

20. A computer-readable medium containing a program to determine a semantic abstract in a topological vector space for a semantic content of a document on a computer system, the program being executable on the computer system to implement the method of claim 14.

21. A method according to claim 14, wherein constructing dominant vectors includes constructing dominant vectors in the topological vector space for the words using the measures of how concretely each word is represented in each chain in the dictionary and the basis, the dominant vectors independent of the document.

22. A method for comparing the semantic content of first and second documents on a computer system, the method comprising:
   identifying a directed set of concepts as a dictionary, the directed set including a maximal element and at least one concept, and at least one chain from the maximal element to every concept;
   selecting a subset of the chains to form a basis for the dictionary;
   accessing dominant phrases for the first document, the dominant phrases representing a condensed content for the first document;
   measuring how concretely each dominant phrase for the first document is represented in each chain in the basis and the dictionary;
   constructing at least one state vector for the first document in a topological vector space for each dominant phrase for the first document using the measures of how concretely each dominant phrase for the first document is represented in each chain in the dictionary and the basis;
   collecting the state vectors for the first document into the semantic abstract for the first document;
   determining a semantic abstract for the second document;
   measuring a distance between the semantic abstracts; and
   classifying how closely related the first and second documents are using the distance.

23. A method according to claim 22, wherein measuring a distance includes measuring a Hausdorff distance between the semantic abstracts.

24. A method according to claim 22, wherein measuring a distance includes determining a centroid vector in the topological vector space for each semantic abstract.

25. A method according to claim 24, wherein measuring a distance further includes measuring an angle between the centroid vectors.

26. A method according to claim 24, wherein measuring a distance further includes measuring a Euclidean distance between the centroid vectors.

27. A computer-readable medium containing a program to compare the semantic content of first and second documents on a computer system, the program being executable on the computer system to implement the method of claim 22.

28. A method according to claim 22, wherein determining a semantic abstract for the second document includes:
   accessing dominant phrases for the second document, the dominant phrases for the second document representing a condensed content for the second document;
   measuring how concretely each dominant phrase for the second document is represented in each chain in the basis and the dictionary;
   constructing at least one state vector for the second document in the topological vector space for each dominant phrase for the second document using the measures of how concretely each dominant phrase for the second document is represented in each chain in the dictionary and the basis; and
   collecting the state vectors for the second document into the semantic abstract for the second document.

29. A method according to claim 22, wherein constructing at least one state vector includes constructing the state vectors for the first document in the topological vector space for each dominant phrase for the first document using the measures of how concretely each dominant phrase for the first document is represented in each chain in the dictionary and the basis, the state vectors independent of the first document and the second document.

30. A method for locating a second document on a computer with a semantic content similar to a first document, the method comprising:
   identifying a directed set of concepts as a dictionary, the directed set including a maximal element and at least one concept, and at least one chain from the maximal element to every concept;

selecting a subset of the chains to form a basis for the dictionary;

accessing dominant phrases for the first document, the dominant phrases representing a condensed content for the first document;

measuring how concretely each dominant phrase for the first document is represented in each chain in the basis and the dictionary;

constructing at least one state vector for the first document in a topological vector space for each dominant phrase for the first document using the measures of how concretely each dominant phrase for the first document is represented in each chain in a dictionary and the basis;

collecting the state vectors for the first document into the semantic abstract for the first document;

locating a second document;

determining a semantic abstract for the second document;

measuring a distance between the semantic abstracts for the first and second documents;

classifying how closely related the first and second documents are using the distance; and if the second document is classified as having a semantic content similar to the semantic content of the first document, selecting the second document.

31. A method according to claim 30, the method further comprising, if the second document is classified as not having a semantic content similar to the semantic content of the first document, rejecting the second document.

32. A method according to claim 30, wherein determining a semantic abstract for the second document includes:

accessing dominant phrases for the second document, the dominant phrases for the second document representing a condensed content for the second document;

measuring how concretely each dominant phrase for the second document is represented in each chain in the basis and the dictionary;

constructing at least one state vector for the second document in the topological vector space for each dominant phrase for the second document using the measures of how concretely each dominant phrase for the second document is represented in each chain in the dictionary and the basis; and collecting the state vectors for the second document into the semantic abstract for the second document.

33. An apparatus on a computer system to determine a semantic abstract in a topological vector space for a semantic content of a document stored on the computer system, the apparatus comprising:

a phrase extractor adapted to extract phrases from the document;

a state vector constructor adapted to construct state vectors in the topological vector space for each phrase extracted by the phrase extractor, the state vectors measuring how concretely each phrase extracted by the phrase extractor is represented in each chain in a basis and a dictionary, the dictionary including a directed set of concepts including a maximal element and at least one chain from the maximal element to every concept in the directed set, the basis including a subset of chains in the directed set; and collection means for collecting the state vectors into the semantic abstract for the document.

34. An apparatus according to claim 33, the apparatus further comprising filter means for filtering the state vectors to reduce the size of the semantic abstract.

35. An apparatus according to claim 33, wherein the state vector constructor is further adapted to construct a state vector for each word in the document.

36. An apparatus according to claim 33, wherein the state vector constructor is operative to construct the state vectors independent of the document.

37. A method for determining a semantic abstract in a topological vector space for a semantic content of a document on a computer system, the method comprising:

extracting dominant phrases from the document using a phrase extractor, the dominant phrases representing a condensed content for the document;

identifying a directed set of concepts as a dictionary, the directed set including a maximal element and at least one concept, and at least one chain from the maximal element to every concept;

selecting a subset of the chains to form a basis for the dictionary;

measuring how concretely each dominant phrase is represented in each chain in the basis and the dictionary;

constructing at least one first state vector in the topological vector space for each dominant phrase using the measures of how concretely each dominant phrase is represented in each chain in the dictionary and the basis;

collecting the first state vectors into dominant phrase vectors for the document;

extracting words from at least a portion of the document;

constructing a second state vector in the topological vector space for each word using the dictionary and the basis;

filtering the second state vectors;

collecting the filtered second state vectors into dominant vectors for the document; and generating the semantic abstract using the dominant phrase vectors and the dominant vectors.

38. A method according to claim 37, the method further comprising comparing the semantic abstract with a second semantic abstract for a second document to determine how closely related the contents of the documents are.

39. A method according to claim 37, wherein constructing a second state vector in the topological vector space for each word using the dictionary and the basis includes:

measuring how concretely each word is represented in each chain in the basis and the dictionary; and constructing the second state vectors in the topological vector space for each word using the measures of how concretely each word is represented in each chain in the dictionary and the basis.

40. A method according to claim 37, wherein:

constructing at least one first state vector includes constructing the first state vector in the topological vector space for each dominant phrase using the measures of how concretely each dominant phrase is represented in each chain in the dictionary and the basis, the first state vector independent of the document; and constructing a second state vector includes constructing the second state vector in the topological vector space for each word using the dictionary and the basis, the second state vector independent of the document.

* * * * *

UNITED STATES PATENT AND TRADEMARK OFFICE
CERTIFICATE OF CORRECTION

PATENT NO.         : 7,197,451 B1
APPLICATION NO. : 09/615726
DATED                  : March 27, 2007
INVENTOR(S)       : Stephen R. Carter et al.

It is certified that error appears in the above-identified patent and that said Letters Patent is hereby corrected as shown below:

Column 3, line 46, the word "topolozical" should read -- topological --;
Column 4, line 49, the word "reciuired" should read -- required --;
Column 6, line 41, the words "(8-4)8 =mt;epmac;01acx; ac;0/acx; ac;02acx; mx." should read -- (8-4)/8=½ --;
Column 6, line 42, the word ""Iuana"" should read -- "Iguana" --;
Column 6, line 45, the words "m is in" should read -- m is --;
Column 7, line 20, the word "7/6)" should read -- 6/7) --;
Column 7, line 27, the word "stae" should read -- state --.

Signed and Sealed this

Seventh Day of April, 2009

JOHN DOLL
*Acting Director of the United States Patent and Trademark Office*